(12) United States Patent
Rudnick et al.

(10) Patent No.: US 7,630,777 B2
(45) Date of Patent: Dec. 8, 2009

(54) APPARATUS AND METHOD FOR CONFIGURABLE PROCESS AUTOMATION IN A PROCESS CONTROL SYSTEM

(75) Inventors: Juergen Rudnick, Gruendau (DE); Jianhua Zhao, Ringoes, NJ (US); James A. Strilich, Phoenix, AZ (US); James M. Schreder, Denver, PA (US); Bodo Fritzsche, Beetzsee (DE)

(73) Assignee: Honeywell International Inc., Morristown, NJ (US)

( * ) Notice: Subject to any disclaimer, the term of this patent is extended or adjusted under 35 U.S.C. 154(b) by 209 days.

(21) Appl. No.: 11/823,237

(22) Filed: Jun. 27, 2007

(65) Prior Publication Data

US 2008/0015714 A1 Jan. 17, 2008

Related U.S. Application Data

(60) Provisional application No. 60/818,760, filed on Jul. 6, 2006.

(51) Int. Cl.
*G05B 11/01* (2006.01)
*G05B 19/18* (2006.01)

(52) U.S. Cl. .................. 700/23; 700/5; 700/11; 700/18; 700/19; 709/221; 709/222; 709/228; 710/8; 710/10; 717/121; 717/127; 718/1; 718/100

(58) Field of Classification Search .............. 700/5, 700/7, 11, 18–19, 23; 709/221–222, 228; 710/8, 10; 717/121, 127; 718/1, 100
See application file for complete search history.

(56) References Cited

U.S. PATENT DOCUMENTS

| 5,499,188 | A | * | 3/1996 | Kline et al. | ............. 700/106 |
| 5,960,441 | A | * | 9/1999 | Bland et al. | ............. 707/104.1 |
| 6,279,101 | B1 | * | 8/2001 | Witt et al. | ............. 712/215 |
| 6,317,638 | B1 | * | 11/2001 | Schreder et al. | ............. 700/79 |

(Continued)

FOREIGN PATENT DOCUMENTS

DE 4206076 A1 9/1993

OTHER PUBLICATIONS

Coherent Technologies, Inc., "Batch Automation and Optimization Experience," retrieved from the web on Jan. 17, 2008, 2 pages.

(Continued)

*Primary Examiner*—Ramesh B Patel
(74) *Attorney, Agent, or Firm*—Munck Carter, P.C.

(57) ABSTRACT

Phase function blocks are associated with a process for producing at least one product or part thereof. For example, a phase function block could reside in a recipe control module defining the process. Each phase function block can be executed to implement the process. A phase function block may acquire and initiate execution of a module providing control over a process element. The phase function block may also provide one or more first parameters to the module. The first parameters define how the module implements a portion of the process using the process element. In addition, the phase function block may retrieve one or more second parameters from the module. The second parameters are associated with results of the execution of the module. Multiple phase function blocks could be contained in multiple recipe control modules, which are distributed in multiple controllers in a hard real-time process control system.

23 Claims, 25 Drawing Sheets

U.S. PATENT DOCUMENTS

| | | | | |
|---|---|---|---|---|
| 6,601,219 | B2* | 7/2003 | Miura et al. | 716/1 |
| 7,020,876 | B1* | 3/2006 | Deitz et al. | 718/100 |
| 7,027,493 | B2* | 4/2006 | Richards | 375/150 |
| 7,027,954 | B2* | 4/2006 | Mets et al. | 702/187 |
| 7,228,527 | B1* | 6/2007 | Phillips et al. | 717/127 |
| 7,369,913 | B2* | 5/2008 | Heminway et al. | 700/100 |
| 2005/0039162 | A1* | 2/2005 | Cifra | 717/105 |
| 2005/0049722 | A1* | 3/2005 | Kobayashi | 700/9 |
| 2007/0192498 | A1* | 8/2007 | Dini et al. | 709/228 |

OTHER PUBLICATIONS

ARC Advisory Group, "Rockwell Automation Process Industry Strategies," Oct. 2006, 38 pages.

Rockwell Automation, "RSBizWare, BatchCampaign," User's Guide, Aug. 2007, 71 pages.

Rockwell Automation, "RSBizWare, Batch Process Management for Batch Manufacturing," PhaseManager User's Guide, Jul. 2005, 143 pages.

International Society for Measurement and Control, "Batch Control, Part 1: Models and Terminology," Draft 12, 1994, 133 pages.

Honeywell, "TotalPlant Batch Specification and Technical Data," Release 3.0, Apr. 2002, 59 pages.

Honeywell, "TotalPlant Batch User Guide," Release 8.0, Jul. 2007, 644 pages, see esp. pp. 141-170, 177-204, 211-220, 253-266, 313-368 and 429-442.

Honeywell, "TotalPlant Batch Technical Reference," Release 8.0, Jul. 2007, 508 pages, see esp. pp. 227-264, 267-270, 293-298 & 379-402.

Honeywell, "TotalPlant Batch User Guide," Release 2.1, May 2000, 449 pages, see esp. pp. 112-132, 137-153, 157-162, 180-184, 196-235 and 280-290.

Honeywell, "TotalPlant Batch Technical Reference," Release 2.1, May 2000, 435, pages, see esp. pp. 160-187, 192-195, 214-217& 335-354.

Namur, NE33: Anforderungen an Systeme zur Rezeptfahrweise, Jan. 2003, pp. 19-30, XP002460673.

Muller-Heinzerling et al., Rezeptgesteuerte Fahrweise Von Chargenprozessen Mit Batch X, Munchen, DE, vol. 36, No. 3, Mar. 1994, gs 43-51, XP000435857.

Pfeffer et al., Automatisierung Von Chargenprozessen Mit Wechselnden Rezepturen in Contronic P, Munchen, DE, vol. 31, No. 8, Aug. 1989, pp. 360-367, XP000053104.

Dokter F, Steuerung Von Chargenprozessen Mit Wechselnden Rezepturen, Munchen, DE, vol. 33, No. 1, Jan. 1991, pp. 26-30, XP000179706.

Kersting et al., Rezeptfahrweise Chemischer Chargenprozesse: Anwendung Der Namur-Empfehlung NE 33, Munchen, DE, vol. 37, No. 2, Feb. 1995, pp. 28-32, XP000492329.

Janicke et al., Rechnergestutzte Systeme Zur Rezeptfahrweise, Munchen, DE, vol. 36, No. 10, Oct 1994, pp. 38-42, XP000484096.

International Search Report dated Dec. 12, 2007 in connection with PCT Application No. PCT/US2007/015376.

Written Opinion of the International Searching Authority dated Jan. 6, 2009 in connection with PCT Application No. PCT/US2007/015376.

\* cited by examiner

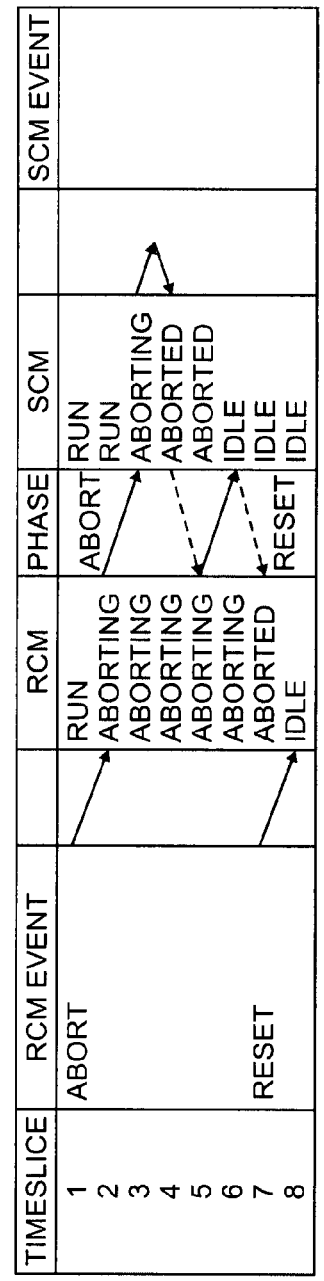

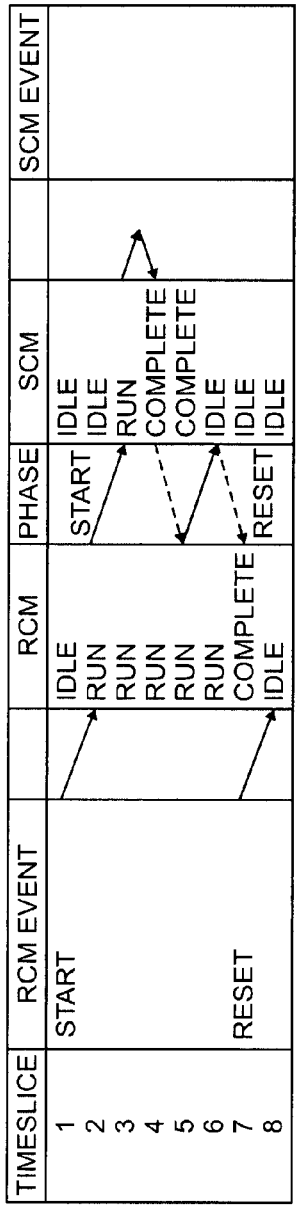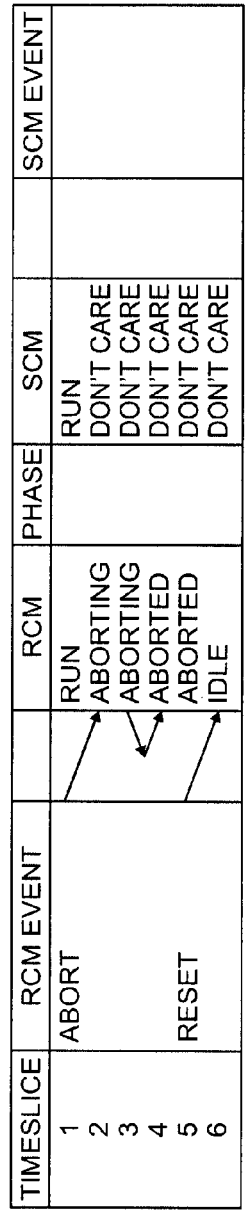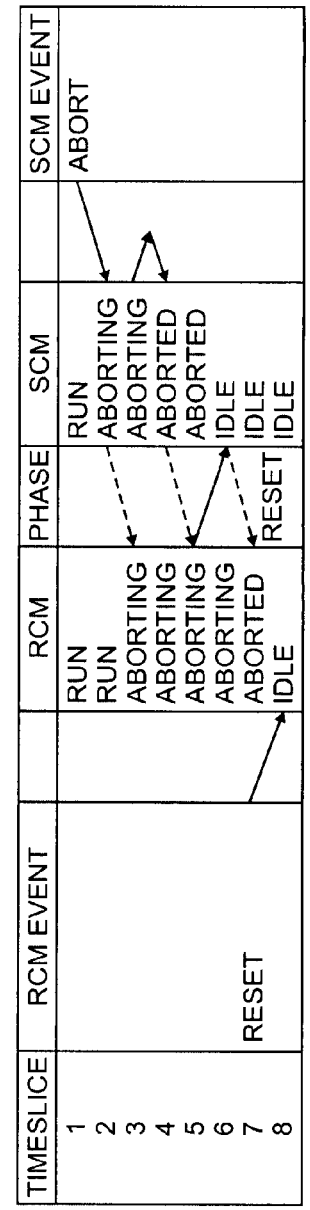
FIG. 17A
FIG. 17B
FIG. 17C

FIG. 18A

| TIMESLICE | RCM EVENT | RCM | PHASE | SCM | SCM EVENT |
|---|---|---|---|---|---|
| 1 |  | IDLE | START | IDLE |  |
| 2 | START | RUN | START | IDLE |  |
| 3 |  | RUN |  | RUN |  |
| 6 |  | RUN |  | DON'T CARE |  |
| 7 | RESET | COMPLETE |  | DON'T CARE |  |
| 8 |  | IDLE |  | DON'T CARE |  |

FIG. 18B

| TIMESLICE | RCM EVENT | RCM | PHASE | SCM | SCM EVENT |
|---|---|---|---|---|---|
| 1 | ABORT | RUN |  | DON'T CARE |  |
| 2 |  | ABORTING |  | DON'T CARE |  |
| 3 |  | ABORTING |  | DON'T CARE |  |
| 4 |  | ABORTED |  | DON'T CARE |  |
| 5 | RESET | ABORTED |  | DON'T CARE |  |
| 6 |  | IDLE |  | DON'T CARE |  |

FIG. 18C

| TIMESLICE | RCM EVENT | RCM | PHASE | SCM | SCM EVENT |
|---|---|---|---|---|---|
| 1 |  | DON'T CARE |  | RUN | ABORT |
| 2 |  | DON'T CARE |  | ABORTING |  |
| 3 |  | DON'T CARE |  | ABORTING |  |
| 4 |  | DON'T CARE |  | ABORTED | RESET |
| 5 |  | DON'T CARE |  | ABORTED |  |
| 6 |  | DON'T CARE |  | IDLE |  |

FIG. 19A

| TIMESLICE | RCM EVENT | RCM | PHASE | SCM | SCM EVENT |
|---|---|---|---|---|---|
| 1 | | RUN | | RUN | |
| 2 | | RUN | RESET | COMPLETE | |
| 3 | | RUN | | COMPLETE | |
| 4 | | RUN | | IDLE | |
| 5 | RESET | COMPLETE | | IDLE | |
| 6 | | IDLE | | IDLE | |

FIG. 19B

| TIMESLICE | RCM EVENT | RCM | PHASE | SCM | SCM EVENT |
|---|---|---|---|---|---|
| 1 | ABORT | | | RUN | DON'T CARE |
| 2 | | | | ABORTING | DON'T CARE |
| 3 | | | | ABORTING | DON'T CARE |
| 4 | | | | ABORTED | DON'T CARE |
| 5 | RESET | | | ABORTED | DON'T CARE |
| 6 | | | | IDLE | DON'T CARE |

FIG. 19C

| TIMESLICE | RCM EVENT | RCM | PHASE | SCM | SCM EVENT |
|---|---|---|---|---|---|
| 1 | | DON'T CARE | | RUN | ABORT |
| 2 | | DON'T CARE | | ABORTING | |
| 3 | | DON'T CARE | | ABORTING | |
| 4 | | DON'T CARE | | ABORTED | |
| 5 | | DON'T CARE | | ABORTED | RESET |
| 6 | | DON'T CARE | | IDLE | |

FIG. 20A

| TIMESLICE | RCM EVENT | RCM | PHASE | SCM | SCM EVENT |
|---|---|---|---|---|---|
| 1 | START | IDLE | | DON'T CARE | |
| 2 | | RUN | | DON'T CARE | |
| 3 | | RUN | | DON'T CARE | |
| 4 | | COMPLETE | | DON'T CARE | |
| 5 | | COMPLETE | | DON'T CARE | |
| 6 | RESET | IDLE | | DON'T CARE | |

FIG. 20B

| TIMESLICE | RCM EVENT | RCM | PHASE | SCM | SCM EVENT |
|---|---|---|---|---|---|
| 1 | ABORT | RUN | | DON'T CARE | |
| 2 | | ABORTING | | DON'T CARE | |
| 3 | | ABORTING | | DON'T CARE | |
| 4 | | ABORTED | | DON'T CARE | |
| 5 | RESET | ABORTED | | DON'T CARE | |
| 6 | | IDLE | | DON'T CARE | |

FIG. 20C

| TIMESLICE | RCM EVENT | RCM | PHASE | SCM | SCM EVENT |
|---|---|---|---|---|---|
| 1 | | DON'T CARE | | RUN | ABORT |
| 2 | | DON'T CARE | | ABORTING | |
| 3 | | DON'T CARE | | ABORTING | |
| 4 | | DON'T CARE | | ABORTED | |
| 5 | | DON'T CARE | | ABORTED | RESET |
| 6 | | DON'T CARE | | IDLE | |

FIG. 21A

| TIMESLICE | RCM EVENT | RCM | PHASE | SCM | SCM EVENT |
|---|---|---|---|---|---|
| 1 | START | IDLE | | DON'T CARE | |
| 2 | | RUN | | DON'T CARE | |
| 3 | | RUN | | DON'T CARE | |
| 4 | | COMPLETE | | DON'T CARE | |
| 5 | | COMPLETE | | DON'T CARE | |
| 6 | RESET | IDLE | | DON'T CARE | |

FIG. 21B

| TIMESLICE | RCM EVENT | RCM | PHASE | SCM | SCM EVENT |
|---|---|---|---|---|---|
| 1 | ABORT | | | RUN | |
| 2 | | | | ABORTING | |
| 3 | | | | ABORTING | |
| 4 | | | | ABORTED | |
| 5 | RESET | | | ABORTED | |
| 6 | | | | IDLE | |

FIG. 21C

| TIMESLICE | RCM EVENT | RCM | PHASE | SCM | SCM EVENT |
|---|---|---|---|---|---|
| 1 | | DON'T CARE | | RUN | ABORT |
| 2 | | DON'T CARE | | ABORTING | |
| 3 | | DON'T CARE | | ABORTING | |
| 4 | | DON'T CARE | | ABORTED | |
| 5 | | DON'T CARE | | ABORTED | RESET |
| 6 | | DON'T CARE | | IDLE | |

FIG. 22A

| TIMESLICE | RCM EVENT | RCM | PHASE | SCM | SCM EVENT |
|---|---|---|---|---|---|
| 1 | START | IDLE | | DON'T CARE | |
| 2 | | RUN | | DON'T CARE | |
| 3 | | RUN | | DON'T CARE | |
| 4 | | COMPLETE | | DON'T CARE | |
| 5 | RESET | COMPLETE | | DON'T CARE | |
| 6 | | IDLE | | DON'T CARE | |

FIG. 22B

| TIMESLICE | RCM EVENT | RCM | PHASE | SCM | SCM EVENT |
|---|---|---|---|---|---|
| 1 | ABORT | RUN | | DON'T CARE | |
| 2 | | ABORTING | | DON'T CARE | |
| 3 | | ABORTED | | DON'T CARE | |
| 4 | | ABORTED | | DON'T CARE | |
| 5 | RESET | ABORTED | | DON'T CARE | |
| 6 | | IDLE | | DON'T CARE | |

FIG. 22C

| TIMESLICE | RCM EVENT | RCM | PHASE | SCM | SCM EVENT |
|---|---|---|---|---|---|
| 1 | | RUN | | DON'T CARE | |
| 2 | (ACTIVE PHASE CHANGE) | RUN | | ABORTED | |
| 3 | | ABORTING | | ABORTED | |
| 4 | RESET | ABORTED | | ABORTED | |
| 5 | | IDLE | | | |

FIG. 23A

| TIMESLICE | RCM EVENT | RCM | PHASE | SCM | SCM EVENT |
|---|---|---|---|---|---|
| 1 | START | IDLE | | DON'T CARE | |
| 2 | | RUN | | DON'T CARE | |
| 3 | | RUN | | DON'T CARE | |
| 4 | | COMPLETE | | DON'T CARE | |
| 5 | RESET | COMPLETE | | DON'T CARE | |
| 6 | | IDLE | | DON'T CARE | |

FIG. 23B

| TIMESLICE | RCM EVENT | RCM | PHASE | SCM | SCM EVENT |
|---|---|---|---|---|---|
| 1 | ABORT | RUN | | DON'T CARE | |
| 2 | | ABORTING | | DON'T CARE | |
| 3 | | ABORTING | | DON'T CARE | |
| 4 | | ABORTED | | DON'T CARE | |
| 5 | RESET | ABORTED | | DON'T CARE | |
| 6 | | IDLE | | DON'T CARE | |

FIG. 23C

| TIMESLICE | RCM EVENT | RCM | PHASE | SCM | SCM EVENT |
|---|---|---|---|---|---|
| 1 | (ACTIVE PHASE CHANGE) | RUN | | DON'T CARE | |
| 2 | | RUN | | ABORTED | |
| 3 | | ABORTING | | ABORTED | |
| 4 | RESET | ABORTED | | ABORTED | |
| 5 | | IDLE | | ABORTED | |

APPARATUS AND METHOD FOR CONFIGURABLE PROCESS AUTOMATION IN A PROCESS CONTROL SYSTEM

CROSS-REFERENCE TO RELATED APPLICATIONS

This application claims priority under 35 U.S.C. §119(e) to U.S. Provisional Patent Application No. 60/818,760 filed on Jul. 6, 2006, which is hereby incorporated by reference.

This application is related to:

U.S. patent application Ser. No. 11/261,015 filed on Oct. 28, 2005;

U.S. patent application Ser. No. 11/453,119 filed on Jun. 14, 2006; and

U.S. patent application Ser. No. 11/823,207 filed on Jun. 27, 2007;

which are all hereby incorporated by reference.

TECHNICAL FIELD

This disclosure relates generally to control systems and more specifically to an apparatus and method for configurable process automation in a process control system.

BACKGROUND

Processing facilities are often managed using process control systems. Example processing facilities include chemical, pharmaceutical, paper, and petrochemical production plants. Among other operations, process control systems typically interact with and control industrial equipment in the processing facilities, such as equipment used to produce chemical, pharmaceutical, paper, or petrochemical products.

To facilitate efficient use of the industrial equipment in a processing facility, a process control system is often used to automate execution of various production processes. Processing facilities often implement one or multiple fast-paced and high-value production processes. This often demands a procedure automation solution that is highly flexible and that can ensure timely execution of the production processes. However, aggressive real-time requirements typically cannot be met with conventional automation solutions, which often rely on supervisory personal computer technology to control the production processes.

SUMMARY

This disclosure provides an apparatus and method for configurable process automation in a process control system.

In a first embodiment, an apparatus includes at least one memory configured to store a phase function block. The phase function block is associated with a process for producing at least one product or part thereof. The apparatus also includes at least one processor configured to execute the phase function block. The phase function block when executed is configured to provide one or more first parameters to a module providing control over a process element. The one or more first parameters define how the module implements at least a portion of the process using the process element. The phase function block when executed is also configured to retrieve one or more second parameters from the module. The one or more second parameters are associated with results of the execution of the module.

In particular embodiments, the phase function block when executed is further configured to acquire and initiate execution of the module and/or to release the module.

In other particular embodiments, the phase function block is associated with a recipe control module defining the process. Also, the module providing control over the process element includes a sequential control module that is configured to provide access to one or more control modules. The one or more control modules are configured to provide the control over the process element.

In yet other particular embodiments, the phase function block when executed is also configured to monitor the status of the sequential control module and to project data from the sequential control module to the recipe control module through the phase function block. The phase function block when executed is further configured to map one or more first states of the recipe control module to one or more first states of the sequential control module and to map one or more second states of the sequential control module to one or more second states of the recipe control module. In addition, the phase function block when executed is further configured to reset the sequential control module after execution of the sequential control module is complete, wait at least a specified amount of time, and release the sequential control module.

In still other particular embodiments, the at least one processor is configured to execute multiple phase function blocks associated with the process element simultaneously.

In additional particular embodiments, a plurality of phase function blocks are associated with a plurality of recipe control modules that are distributed in a plurality of controllers in a hard real-time process control system. Also, the process element includes a piece of processing equipment used to produce at least one of a chemical, pharmaceutical, paper, or petrochemical product.

In a second embodiment, a method includes storing a phase function block associated with a process for producing at least one product or part thereof. The method also includes executing the phase function block. Executing the phase function block includes providing one or more first parameters to a module providing control over a process element. The one or more first parameters define how the module implements at least a portion of the process using the process element. Executing the phase function block also includes retrieving one or more second parameters from the module. The one or more second parameters are associated with results of the execution of the module.

In a third embodiment, a computer program is embodied on a computer readable medium. The computer program includes computer readable program code for creating a phase function block associated with a process for producing at least one product or part thereof. The computer program also includes computer readable program code for executing the phase function block. The executing includes providing one or more first parameters to a module providing control over a process element. The one or more first parameters define how the module implements at least a portion of the process using the process element. The executing also includes retrieving one or more second parameters from the module. The one or more second parameters are associated with results of the execution of the module.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 14A through 23C illustrate example interactions between a recipe control module, a phase function block, and a sequential control module in a process control system in accordance with this disclosure;

DETAILED DESCRIPTION

Figure 1:
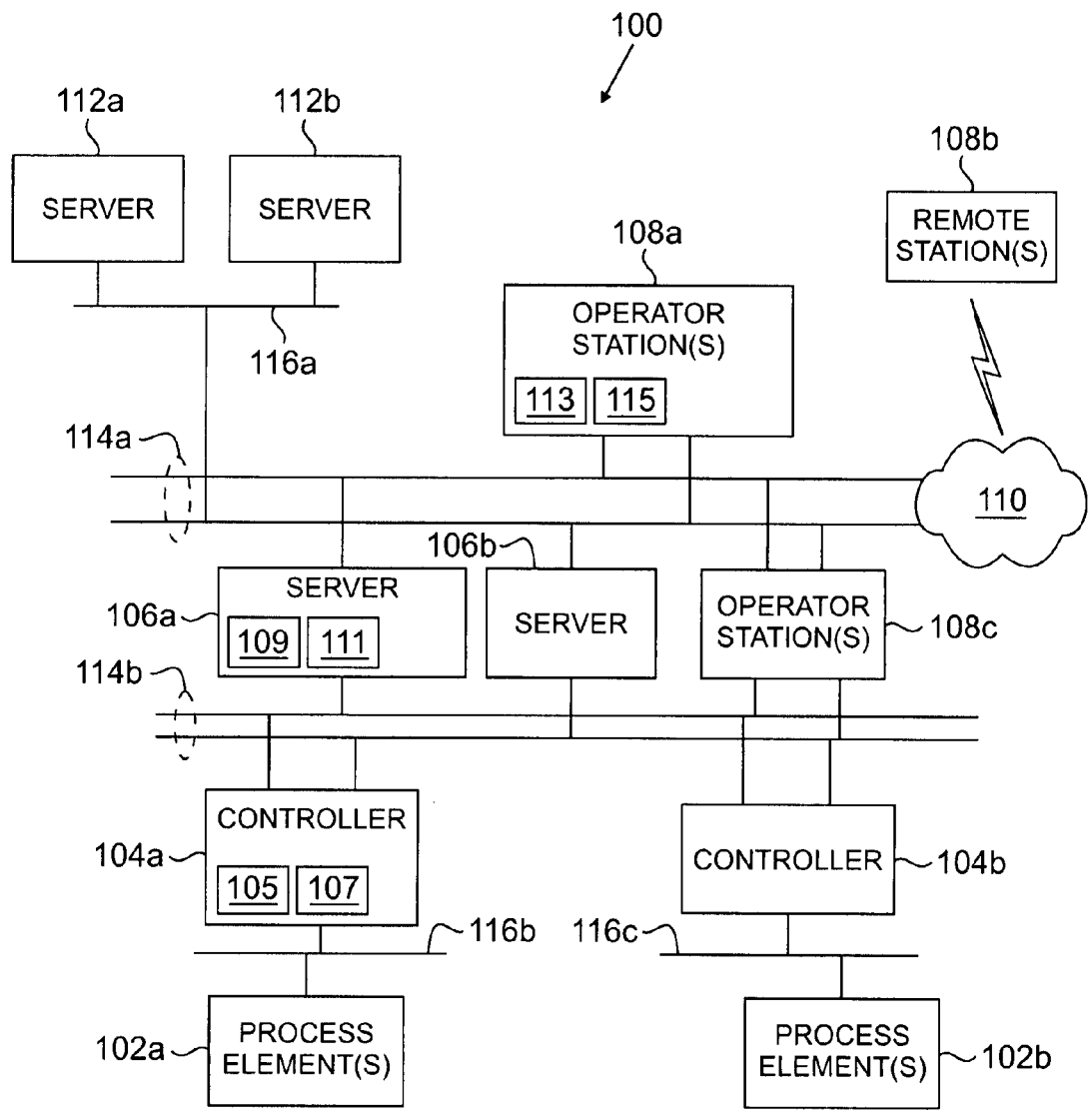
FIG. 1 illustrates an example process control system in accordance with this disclosure.

FIG. 1 illustrates an example process control system 100 in accordance with this disclosure. The embodiment of the process control system 100 shown in FIG. 1 is for illustration only. Other embodiments of the process control system 100 may be used without departing from the scope of this disclosure.

In this example embodiment, the process control system 100 includes one or more process elements 102a-102b. The process elements 102a-102b represent components in a process or production system that may perform any of a wide variety of functions. For example, the process elements 102a-102b could represent equipment used to manufacture chemical, pharmaceutical, paper, or petrochemical products. Each of the process elements 102a-102b includes any hardware, software, firmware, or combination thereof for performing one or more functions in a process or production system.

Two controllers 104a-104b are coupled to the process elements 102a-102b. The controllers 104a-104b control the operation of the process elements 102a-102b. For example, the controllers 104a-104b could be capable of providing control signals to the process elements 102a-102b for controlling the production of chemical, pharmaceutical, paper, or petrochemical products. Each of the controllers 104a-104b includes any hardware, software, firmware, or combination thereof for controlling one or more of the process elements 102a-102b. The controllers 104a-104b could, for example, include one or more processors 105 and one or more memories 107 storing instructions and data used, collected, or generated by the processor(s) 105. As particular examples, the processors 105 could include processors of the POWERPC processor family running the GREEN HILLS INTEGRITY operating system or processors of the X86 processor family running a MICROSOFT WINDOWS operating system.

Two servers 106a-106b are coupled to the controllers 104a-104b. The servers 106a-106b perform various functions to support the operation and control of the controllers 104a-104b and the process elements 102a-102b. For example, the servers 106a-106b could log information collected or generated by the controllers 104a-104b, such as status information related to the operation of the process elements 102a-102b. The servers 106a-106b could also execute applications that control the operation of the controllers 104a-104b, thereby controlling the operation of the process elements 102a-102b. In addition, the servers 106a-106b could provide secure access to the controllers 104a-104b. Each of the servers 106a-106b includes any hardware, software, firmware, or combination thereof for providing access to or control of the controllers 104a-104b. Each of the servers 106a-106b could, for example, include one or more processors 109 and one or more memories 111 storing instructions and data used, collected, or generated by the processor(s) 109 (such as software executed by the servers 106a-106b). As particular examples, the processors 109 could include processors of the X86 processor family running a MICROSOFT WINDOWS operating system.

One or more operator stations 108a-108b are coupled to the servers 106a-106b, and one or more operator stations 108c are coupled to the controllers 104a-104b. The operator stations 108a-108b represent computing or communication devices providing user access to the servers 106a-106b, which could then provide user access to the controllers 104a-104b and the process elements 102a-102b. The operator stations 108c represent computing or communication devices providing direct user access to the controllers 104a-104b. As particular examples, the operator stations 108a-108c could allow users to review the operational history of the process elements 102a-102b using information collected by the controllers 104a-104b and/or the servers 106a-106b. The operator stations 108a-108c could also allow the users to adjust the operation of the process elements 102a-102b, controllers 104a-104b, or servers 106a-106b. Each of the operator stations 108a-108c includes any hardware, software, firmware, (or combination thereof for supporting user access and control of the system 100. Each of the operator stations 108a-108c could, for example, include one or more processors 113 and one or more memories 115 storing instructions and data used, collected, or generated by the processor(s) 113 (such as software executed by the operator stations 108a-108c). In particular embodiments, the operator stations 108a-108c could represent personal computers executing a MICROSOFT WINDOWS operating system.

In this example, at least one of the operator stations 108b is remote from the servers 106a-106b. The remote station is coupled to the servers 106a-106b through a network 110. The network 110 facilitates communication between various components in the system 100. For example, the network 110 may communicate Internet Protocol (IP) packets, frame relay frames, Asynchronous Transfer Mode (ATM) cells, or other information between network addresses. The network 110 may include one or more local area networks (LANs), metropolitan area networks (MANs), wide area networks (WANs), all or a portion of a global network such as the Internet, or any other communication system or systems at one or more locations.

In this example, the system 100 includes two additional servers 112a-112b. The servers 112a-112b execute various applications to control the overall operation of the system 100. For example, the system 100 could be used in a processing or production plant or other facility, and the servers 112a-112b could execute applications used to control the plant or other facility. As particular examples, the servers 112a-112b could execute applications such as enterprise resource planning (ERP), manufacturing execution system (MES), or any other or additional plant or process control applications. Each of the servers 112a-112b includes any hardware, software, firmware, or combination thereof for controlling the overall operation of the system 100.

As shown in FIG. 1, the system 100 includes various redundant networks 114a-114b and single networks 116a-116c that support communication between components in the system 100. Each of these networks 114a-114b, 116a-116c represents any network or combination of networks facilitating communication between components in the system 100. The networks 114a-114b, 116a-116c could, for example, represent Ethernet networks.

In one aspect of operation, the process control system 100 manages one or multiple processes for producing one or more products (or parts thereof). As particular examples, the controllers 104a-104b and the servers 106a-106b could manage one or multiple processes used to produce chemical, pharmaceutical, paper, or petrochemical products using the process elements 102a-102b. The process control system 100 may implement a procedural automation mechanism that helps to automate the production processes. For example, the procedural automation mechanism may determine when certain tasks in a production process can be performed and which process elements 102a-102b are used during those tasks.

In some embodiments, the procedural automation mechanism supports the use of one or multiple "recipes." A recipe generally represents information defining the production requirements for one or more specific products (or parts thereof). For example, in some embodiments, a recipe is implemented using one or more function blocks, which represent executable software objects that can be combined together to define a control process implemented by one or more controllers 104a-104b. As a particular example, a recipe could be implemented using multiple "phase" function blocks, which represent phases or portions of a recipe (such as individual steps of the recipe).

In particular embodiments, as described in more detail below, the phase function blocks can be distributed within recipe control modules (RCMs) to one or more control execution environments (CEEs) executed, provided, or supported by the controllers 104a-104b. Also, the recipe control modules may support parallel phase function block execution and multi-level nested control of sequences via the phase function blocks. Configuration options of the phase function blocks can determine the interactions between controlling and controlled state machines, and multiple phase function blocks can be used for the same controlled multi-layer state machine. Multiple phase function blocks can also be executed in the context of another multi-layer state machine, and those function blocks can be distributed across multiple controllers of a distributed control system (DCS). This provides a highly flexible and highly robust technique for modular process automation. Moreover, modular function blocks for any level of control, with extensible limits on the number of levels supported, can be used to provide the ability to coordinate procedure or sequence control from any level. A user could intercept an automatic operation at any level and at any time to make changes to the process control system 100. When desired, the process control system 100 could recover automatically from any operator intervention in a deterministic fashion and return to fully automatic operation. When runtime errors occur that cannot be handled automatically, the user could correct those errors, and the process control system 100 could resume automatic operation as soon as the last error has been corrected. Many configurable options can be provided to allow consistent, yet site-specific, methodologies with respect to error handling, monitoring, and propagation (both upwards and downwards) in the process automation hierarchy.

Although FIG. 1 illustrates one example of a process control system 100, various changes may be made to FIG. 1. For example, a process control system could include any number of process elements, controllers, servers, operator stations, and networks. Also, the makeup and arrangement of the process control system 100 is for illustration only. Components could be added, omitted, combined, or placed in any other configuration according to particular needs. Further, while described as being used to produce certain types of products, the process control system 100 could be used in any other manner. In addition, FIG. 1 illustrates one operational environment in which the procedural automation mechanism can be used. The procedural automation mechanism could be used in any other device or system.

Figure 2:
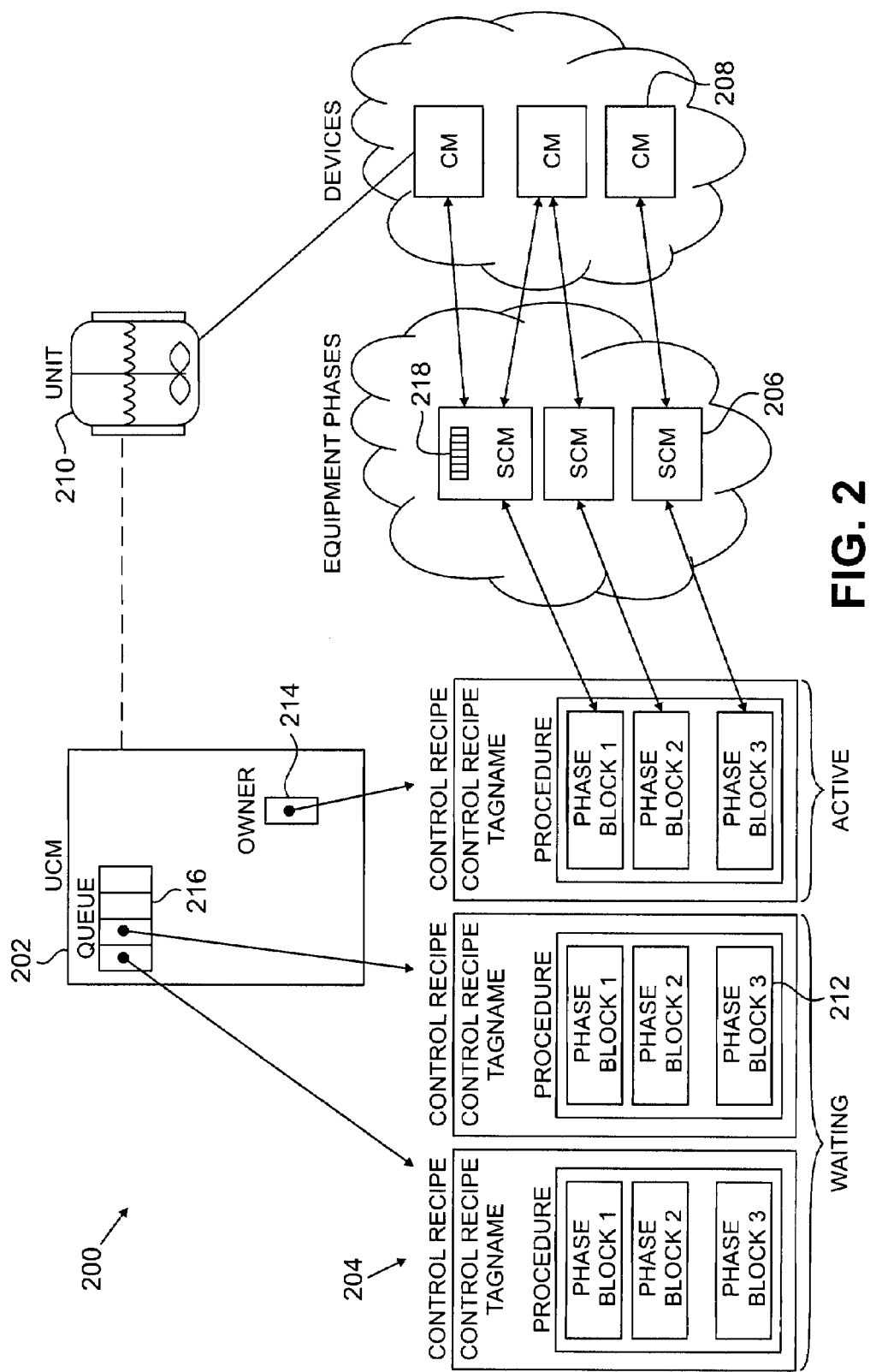
FIG. 2 illustrates a specific implementation of a process control system in accordance with this disclosure.

FIG. 2 illustrates a specific implementation of a process control system 200 in accordance with this disclosure. In particular, the process control system 200 of FIG. 2 could represent a specific implementation of the process control system 100 of FIG. 1, where many of the components in FIG. 2 are used or supported by the controllers 104a-104b of FIG. 1. The embodiment of the process control system 200 in FIG. 2 is for illustration only. Other embodiments of the process control system 200 could be used without departing from the scope of this disclosure.

As shown in FIG. 2, the process control system 200 includes one or more unit control modules (UCMs) 202, recipe control modules (RCMs) 204, sequential control modules (SCMs) 206, and control modules (CMs) 208. In some embodiments, the unit control modules 202, recipe control modules 204, sequential control modules 206, and control modules 208 are distributed across multiple control execution environments in the process control system 100, such as the controllers 104a-104b.

A unit control module 202 generally represents or is associated with a process unit 210 that contains one or multiple pieces of processing equipment, where use of the process unit 210 occurs after acquisition of the unit control module 202. As described in U.S. patent application Ser. No. 11/453,119, requester function blocks and resource function blocks can be invoked by, incorporated into, or otherwise used by the various control modules 202-208. The resource function blocks represent objects that can be acquired and released by the requester function blocks, where the requester function blocks use arbitration requests to attempt to acquire the resource function blocks. In these embodiments, a unit control module 202 can be acquired by a recipe control module 204, which allows the process unit 210 to be used during execution of the recipe control module 204.

A recipe control module 204 generally represents information defining the production requirements for one or more specific products (or parts thereof), where execution of a recipe control module 204 could result in the production of a single batch of the one or more products (or parts thereof). A recipe control module 204 could include a header, a procedure, a formula, and any equipment requirements. The procedure in a recipe control module 204 is defined by a set of phases represented by phase function blocks 212. Each phase of a recipe control module 204 is associated with a sequential control module 206, which interacts with one or more control modules 208 to implement one of the phases of the recipe control module 204. The control modules 208 provide access to and control over the actual process unit 210. The procedure in a recipe control module 204 could also include a set of step, transition, and synchronization blocks. Step blocks provide read/write access to the control modules 208, and synchronization blocks allow parallel execution of phase function blocks 212 or step blocks.

A recipe control module 204 manipulates the sequential control modules 206 through its phases, where the phases control the sequential control modules 206, monitor the execution states of the sequential control modules 206, and optionally propagate the execution states to the recipe control module 204. Phase function blocks 212 may also monitor their parent recipe control modules' states and propagate the states to their underlying sequential control modules 206 when their parent recipe control modules 204 enter abnormal states. In particular embodiments, the various control modules 204-208 could operate as defined by the International Electrotechnical Commission (IEC) 61131 and 61512 (including 61512-1) standards or in U.S. Pat. No. 6,317,638 (all of which are hereby incorporated by reference).

When a recipe control module 204 is created, it may optionally be associated with a specific unit control module 202. The unit control module 202 can be acquired when the recipe control module 204 is executed and can optionally be released by the recipe control module 204 at any time, such as when the recipe control module 204 reaches a terminal state or at any other previous time. Various parameters can be defined within the phase function blocks 212. These parameters may include a reference to a sequential control module 206 for execution control, a resource name to be allocated when a phase is started, and a flag indicating if the acquired resource will be released at the end of the execution of a sequential control module 206. By default, the resource name may be based on the selected sequential or recipe control module's name. If there is no selected sequential control module 206, a phase can be used for resource management purposes. Once in a terminal state, all resources acquired by the recipe control module 204 may or may not be released depending on the configuration flag.

An owner pointer 214 in the unit control module 202 identifies the recipe control module 204 currently being executed (the recipe control module 204 that currently owns or has acquired the unit control module 202). An arbitration queue 216 identifies a specified number of recipe control modules 204 waiting to acquire the unit control module 202 to execute. When the current recipe control module 204 (identified by the owner pointer 214) releases the unit control module 202, the unit control module 202 can select the next recipe control module 204 from the queue 216 using any arbitration technique supported by the unit control module 202 or defined by the user (such as first-in, first-out or other technique). Similarly, the sequential control module 206 may include an arbitration queue 218. One or more recipe control modules 204 that are waiting to acquire the sequential control module 206 on behalf of its phase blocks are identified in the arbitration queue 218 of the sequential control module 206. The recipe control modules can be selected from the queue 218 in any order.

In general, a phase function block 212 in a recipe control module 204 represents a function block used to acquire, initiate execution of, and monitor execution of a sequential control module 206 or another recipe control module 204. For example, if a phase function block 212 is configured to execute a sequential control module 206, the phase function block 212 may acquire the sequential control module 206, load formula parameters into the sequential control module 206, and start the sequential control module 206. The formula parameters represent a set of parameters used by a phase to communicate appropriate recipe data to a sequential control module 206, such as data controlling how the process unit 210 is used during the phase execution.

While a sequential control module 206 is executing, the phase function block 212 may monitor the status of the sequential control module 206. The phase function block 212 may also project data from the sequential control module 206 so that SCM execution can be monitored by a recipe control module 204 through the phase function block 212. Further, the phase function block 212 may command the sequential control module 206 to upload various report parameters to the phase function block 212, such as when execution of the sequential control module 206 is complete or another terminal state is reached. Depending on the configuration, a phase function block 212 may or may not wait for the sequential control module 206 to complete before the phase completes, which allows the recipe control module 204 to proceed to the following phase or step. Moreover, depending on the configuration, the phase function block 212 may or may not release any acquired resources (such as the sequential control module 206) at the completion of the phase. In addition, the recipe control modules 204 and the phase function blocks 212 may generate and report batch events, which represent events associated with execution of a recipe. One example of batch event reporting is provided in U.S. patent application Ser. No. 11/823,207 (which has been incorporated by reference).

In some embodiments, the functionality of a phase function block 212 can be divided into three general categories. First, the phase function block 212 may provide or download data (such as parameter definitions and formula parameters) to a sequential control module 206 and receive or upload data (such as result parameter values) from the sequential control module 206. Second, the phase function block 212 may provide step-like behavior, including control of the sequential control module 206. In addition, the phase function block 212 can engage in resource arbitration by requesting acquisition of and releasing the sequential control module 206 (as describing in U.S. patent application Ser. No. 11/453,119. These functions could be implemented as independent as possible to provide a higher degree of modularity, more simplified testing, and more universal use.

In particular embodiments, phase function blocks 212 may be the same as or similar to custom data blocks or custom algorithm blocks used in process control systems. In these embodiments, the phase function blocks 212 could support fixed and custom parameters, and the custom parameters could include formula and report parameters. Additional details regarding custom data blocks and custom algorithm blocks and the creation and maintenance thereof are provided in U.S. patent application Ser. No. 11/261,015, which is hereby incorporated by reference. Also, the phase function blocks 212 could only be contained in recipe control modules 204, and a phase function block 212 could control a single sequential control module 206.

In a manner similar to the creation of a custom data block or a custom algorithm block, a user could define phase function blocks 212 and create instances of the phase function blocks 212 for use. For example, the user could define phase function block types and then create phase function blocks, which represent specific instances of the phase function block types. As a particular example, the user could use a form having different tabs, where each tab allows the user to provide different information about a type of phase function block 212. One example of a form used to define phase function blocks 212 is shown in FIGS. 3 through 9, which are described below.

In particular embodiments, the recipe control modules 204 can be arranged hierarchically. For example, a higher-level recipe control module could define a process for producing at least one product or part thereof. A lower-level recipe control module (which is initiated by a higher-level recipe control module) could define a subset of that process. In these embodiments, the phase function blocks 212 could define the linkages between higher-level and lower-level recipe control modules. The phase function blocks 212 could also define a set of formula parameters that a higher-level recipe control module passes to a lower-level recipe control module when the lower-level module is initiated by the higher-level module. The phase function blocks 212 could also define a set of report parameters that hold the results of the execution of the lower-level module. The phase function blocks 212 could also define state propagation rules for both directions (from the higher-level module to the module below it and from the lower-level module to the module above it). In addition, the phase function blocks 212 could define the arbitration behavior of the phase function blocks 212.

Although FIG. 2 illustrates a specific implementation of a process control system 200, various changes may be made to FIG. 2. For example, the process control system 200 could include any number of unit control modules 202, recipe control modules 204, sequential control modules 206, control modules 208, process units 210, and phase function blocks 212.

FIGS. 3 through 9 illustrate an example form 300 used to configure a phase function block in a process control system in accordance with this disclosure. For example, the form 300 could be used to create or modify a specific phase function block or to create or modify a phase function block type, which could then be used to create specific phase function blocks of that type. The form 300 shown in FIGS. 3 through 9 is for illustration only. Any other mechanism(s) could be used to create, modify, and delete phase function blocks or phase function block types. Also, for ease of explanation, the form 300 is described as being used to manage phase function blocks 212 or phase function block types in the process control system 200 of FIG. 2. The form 300 could be used with any other function blocks, types, and systems.

In general, the form 300 can be used to define various aspects of a phase function block 212. In this example, the form 300 can be accessed by a user via a tree 302 and an RCM definition window 304. The tree 302 allows the user to select (among other things) an existing recipe control module 204 in a process control system. New recipe control modules 204 could be generated in any suitable manner, such as by using the tree or by selecting the appropriate command under a menu. Selection of an existing recipe control module 204 could present the user with the RCM definition window 304, which allows the user to define or modify the selected recipe control module 204. Part of this definition or modification could include the creation or modification of a phase type, which can be created by (among other things) defining formulas and report parameters. Instances of the phase types, which represent the actual phase function blocks 212, can then be created within the recipe control module 204. When the user indicates a desire to create or modify a phase function block, the user could be presented with the form 300.

Figure 3:
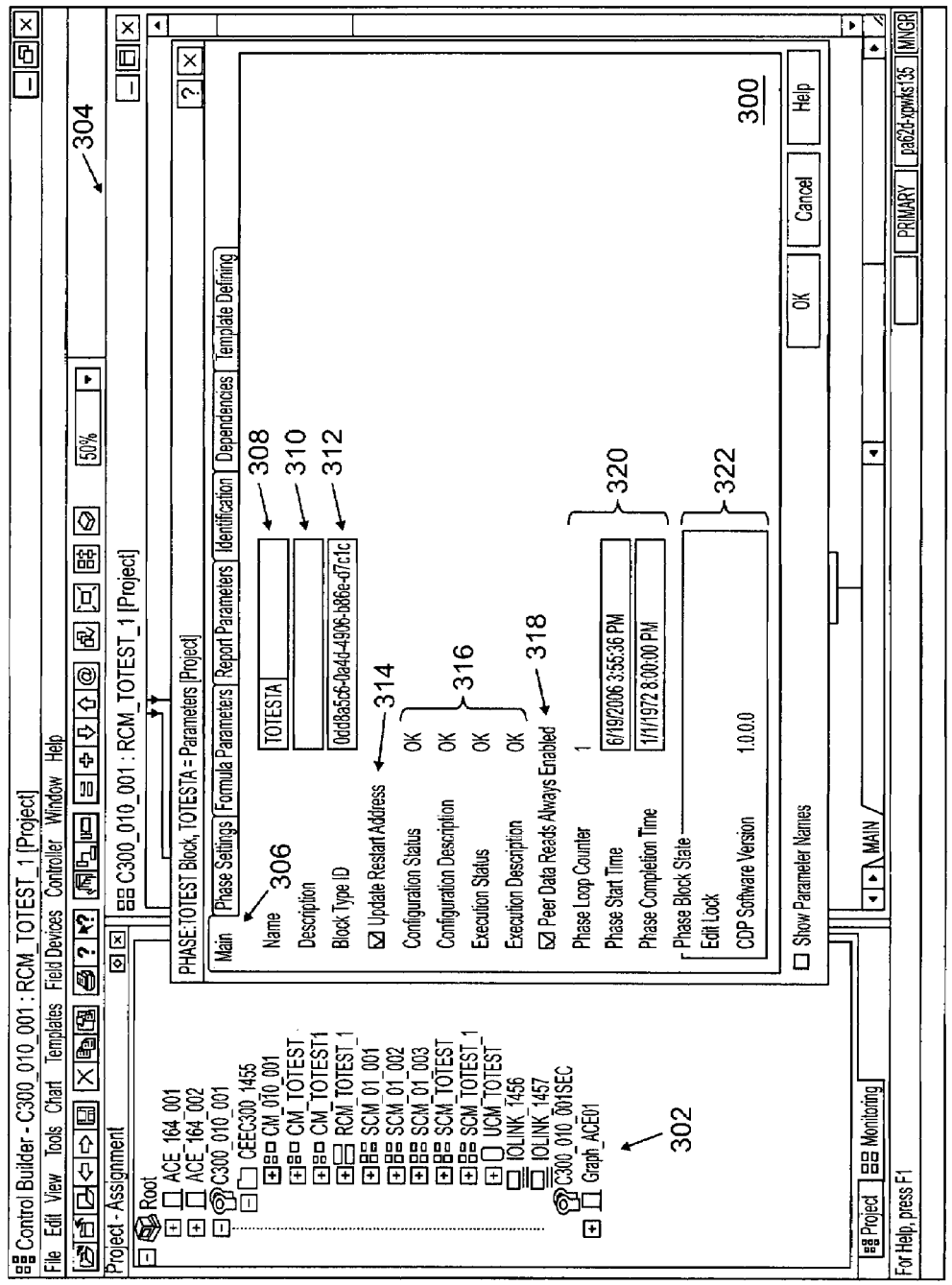
FIGS. 3 through 9 illustrate an example form used to configure a phase function block in a process control system in accordance with this disclosure.

As shown in FIG. 3, the form 300 includes multiple tabs 306, which can be used to present different information and options to the user in the form 300. Selection of the "Main" tab 306 in the form 300 presents the user with the information and options shown in FIG. 3. This includes two text boxes 308-310 allowing the user to provide a name and description of a phase function block 212. The form 300 also includes a block identifier 312, which could uniquely identify the phase function block 212 in a process control system and be generated automatically. A checkbox 314 indicates whether the phase function block 212 can be restarted where it stopped (restart address is updated) or at its beginning when its execution is interrupted. Status information 316 identifies the current status and description of the configuration of the phase function block 212 and the execution of the phase function block 212. A checkbox 318 indicates whether peer-to-peer reads (such as those involving a component in a different control execution environment on a different controller) are always enabled, even if the read is not required. Phase execution information 320 identifies miscellaneous information regarding execution of the phase function block 212, such as the current loop iteration and the most recent start and completion times and dates for the phase function block 212. State information 322 identifies the current state and version number of the phase function block 212.

Figure 4:
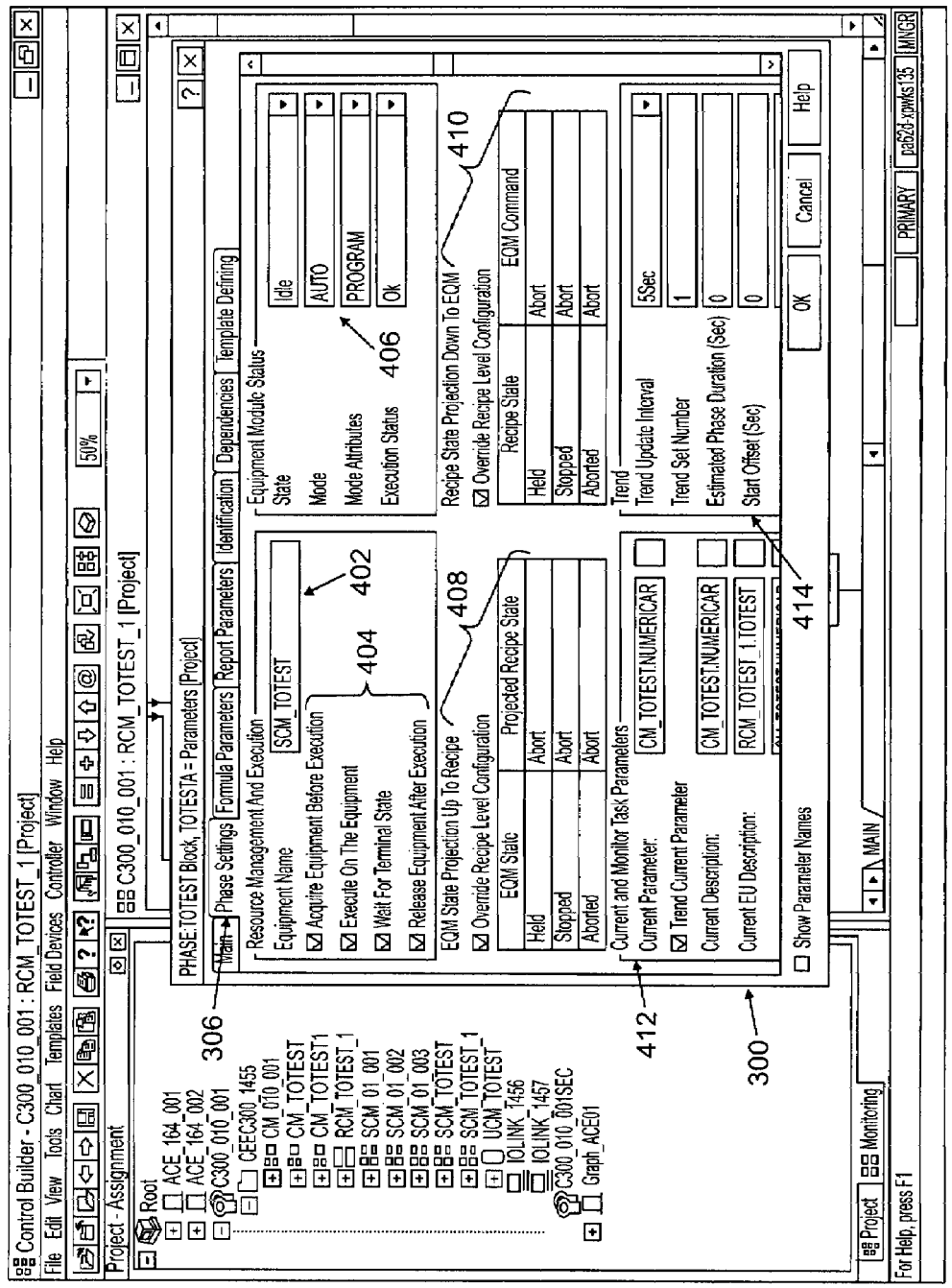

Selection of the "Phase Settings" tab 306 in the form 300 presents the user with the information and options shown in FIG. 4. A text box 402 allows the user to identify the resource that a phase function block 212 uses at runtime. This often represents a sequential control module 206, although other values could be used. For example, the text box 402 could also name a recipe control module 204 or "none" if the phase function block 212 is used as a Null phase block (which holds a recipe level formula and report parameters). A Null phase function block 212 need not perform or provide any phase control functionality.

Checkboxes 404 control how the phase function block 212 acquires and releases the identified resource. For example, the checkboxes 404 could identify whether the phase function block 212 should acquire the resource before beginning execution. The checkboxes 404 could also identify whether the phase function block 212 will execute and control the resource. In some embodiments, a phase function block 212 could be used only for resource arbitration (such as when it acquires the SCM ahead of time for another phase function block 212 to use). In this case, the phase function block 212 could be configured to not execute the sequential control module 206. The checkboxes 404 could further identify whether the phase function block 212 should wait for the resource to reach a terminal state before the phase function block 212 completes its execution. In addition, the checkboxes 404 could identify whether the phase function block 212 should release the resource after the phase function block 212 reaches a terminal state.

A set of drop-down menus 406 allows the user to control various expected status parameters of the sequential control module 206. For example, the user can define what the state, mode, mode attribute, and execution status of the sequential control module 206 should be before execution of the sequential control module 206 begins. The state identifies the current status of the sequential control module 206. The mode attribute controls whether a phase function block 212 can automatically program the sequential control module 206 (such as by loading formula parameters into the SCM). The mode controls whether the phase function block 212 can automatically change the value of the SCM's mode attribute. The execution status identifies the current execution status of the sequential control module 206.

Figure 10:
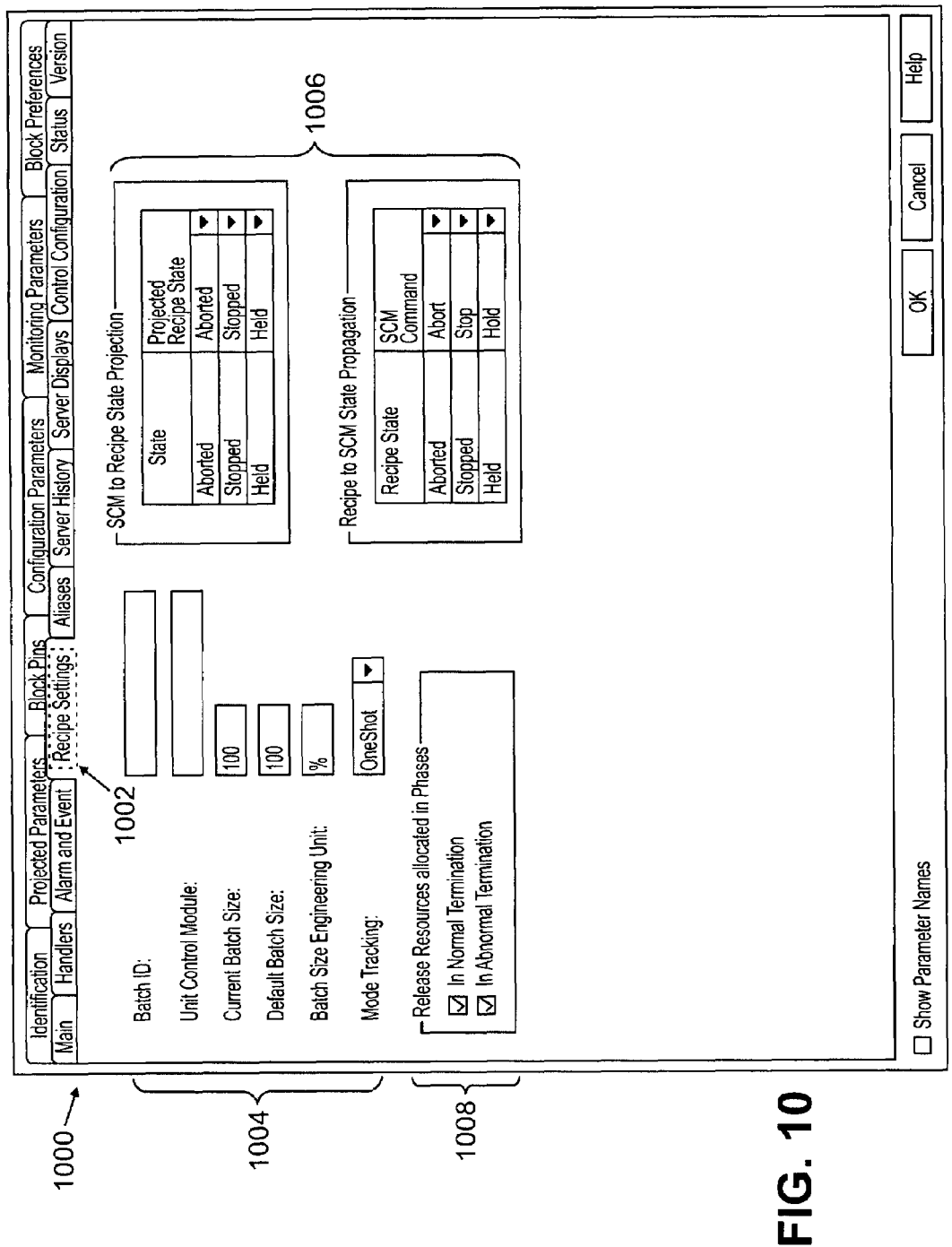
FIGS. 10 through 12 illustrate example forms used to configure and monitor a recipe control module in a process control system in accordance with this disclosure.

State projection section 408 controls how one or more abnormal states in the equipment associated with the phase function block 212 (such as the SCM or other resource) are mapped to one or more states of the recipe control module 204. For example, the state projection section 408 could indicate that Held, Stopped, and Aborted states in a resource translate to the Abort state in the recipe control module 204. Similarly, state propagation section 410 controls how one or more abnormal states in the recipe control module 204 are mapped to one or more states in the resource associated with the phase function block 212. For example, the state propagation section 410 could indicate that Held, Stopped, and Aborted states in the recipe control module 204 translate to the Abort state in the resource. In some embodiments, default values for the state projections and propagations can be defined in a recipe control module 204 (such as shown in FIG. 10), and checkboxes in the sections 408-410 allow the options in the sections 408-410 to override the default values. Overall, these two sections 408-410 allow states of the recipe control module 204 and the sequential control module 206 to be maintained consistently in the system.

A parameters section 412 allows the user to identify parameters and their associated descriptions used by the phase function block 212. A checkbox in the parameters section 412 indicates whether the trend of a particular parameter should be tracked. If checked, a trend section 414 allows the user to define various information about tracking the trend of a parameter. This could include information about the expected duration of the phase function block's execution and how often the status of a parameter is updated (the trend update interval). This could also include a value assigned to the trend and an initial offset or delay in tracking the trend of the parameter.

Figure 5:
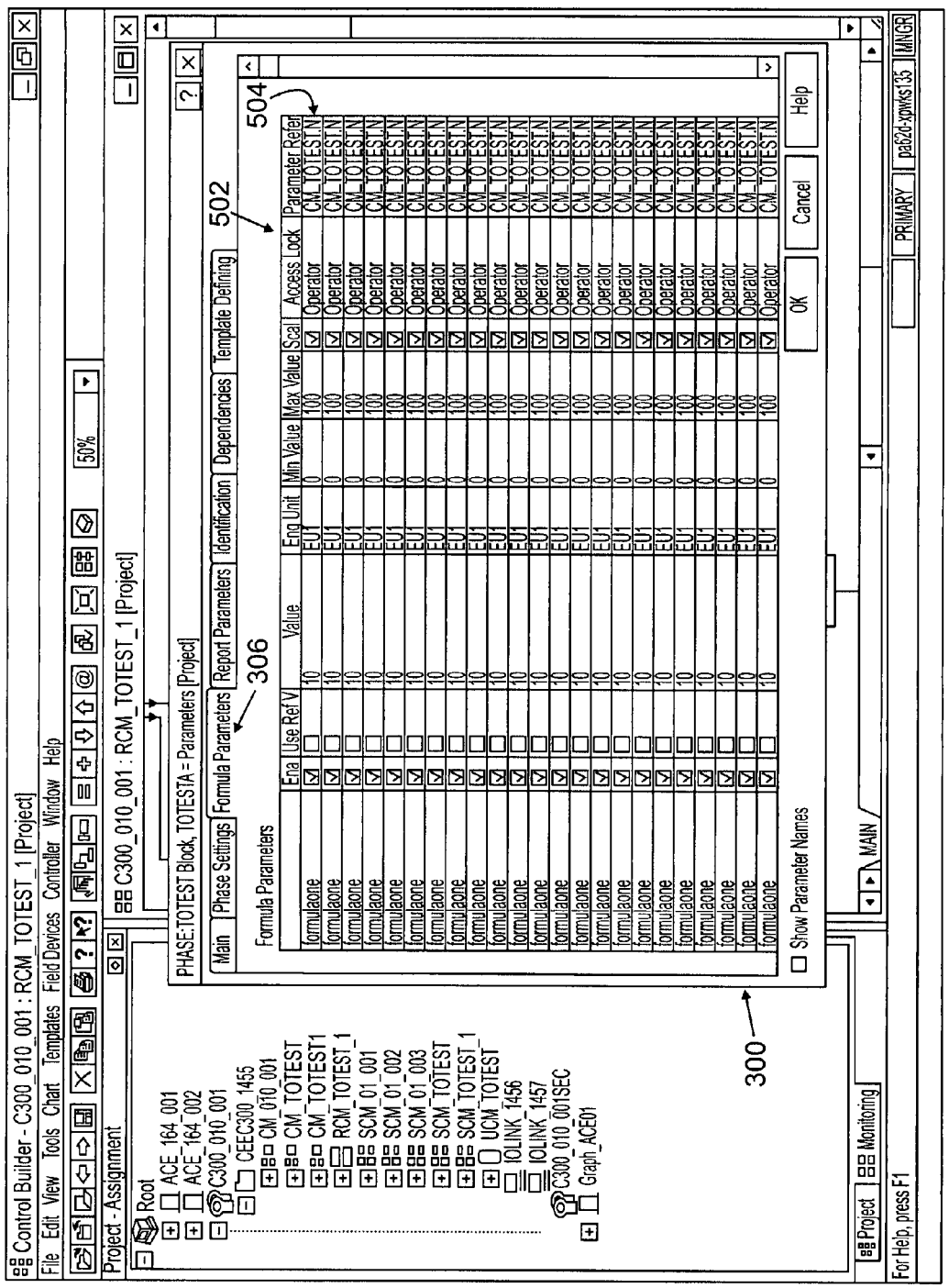

Selection of the "Formula Parameters" tab 306 in the form 300 presents the user with the information and options shown in FIG. 5. In general, formula parameters represent data downloaded into a sequential control module 206 or other resource for use in executing a phase of a recipe control module 204 on a process unit 210. In this example, the information and options include a table 502 of entries 504 identifying the user-defined formula parameters for the phase function block 212.

The formula parameters defined in the entries 504 could include the following fields, each of which may or may not appear in FIG. 5. A parameter name represents a user-defined name for the formula parameter in the table 502. A description represents a short description of the formula parameter, and a data type defines the data type of the formula parameter (such as real, string, Boolean, or enumeration). An enable flag indicates whether use of a particular formula parameter is currently enabled or disabled. A value identifies the actual value currently assigned to the formula parameter, which could be overwritten by an authorized user at creation time or runtime. A "use reference value" flag indicates whether the actual value for the formula parameter is defined in the table 502 or referenced at a different location. An engineering unit specifies the unit of measurement (time, volume, etc.) for the formula parameter's value. A minimum value and a maximum value specify a range of allowable values for the formula parameter. A scalable flag indicates whether the formula parameter can be scaled based on a batch scale factor, allowing the formula parameter's value to be altered depending on whether a total or partial batch of a product is being produced (although other embodiments could use more complex formulas or inserted functions for mathematical transformations of formula parameters). A parameter reference defines the destination of the formula parameter's value, or the location where the parameter value is written to during parameter downloading (such as to a sequential control module 206 for writing to a control module 208). An access lock controls whether the formula parameter can be changed by an operator, a high-level program, or recipe phase logic at creation time or runtime.

In some embodiments, a user may configure the parameter name, and a process control system provides a mechanism to automatically generate the other fields (which can then be modified by the user). For example, the user could define the parameter name HeatTarget. The process control system could then generate a description HeatTarget.Description, a data type HeatTarget.DataType, and so on. Each field in an entry 504 could be treated as an individual element, and information for each field could be required. The defined formula parameters could then be stored in a database. In particular embodiments, a limited number of formula parameters (such as fifty) could be configured for each phase function block 212, although no hard limit on the number of formula parameters could also be supported. Also, in particular embodiments, a parameter definition editor (such as that disclosed in U.S. patent application Ser. No. 11/261,015) can be used to define the formula parameters. The invocation of the parameter definition editor could be consistent with the creation of custom data blocks.

Figure 6:
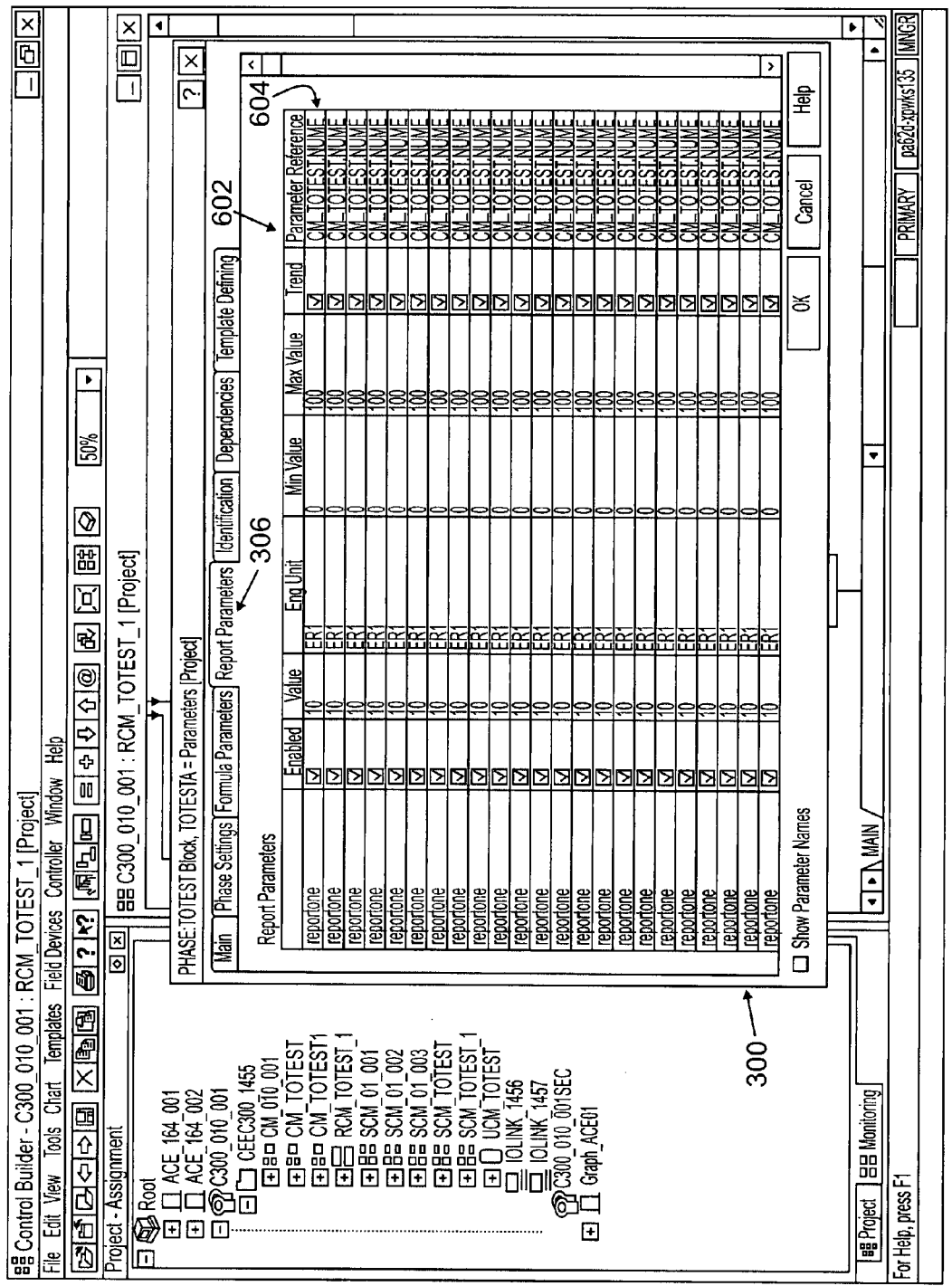

Selection of the "Report Parameters" tab 306 in the form 300 presents the user with the information and options shown in FIG. 6. In general, report parameters are used by a phase function block 212 to retrieve execution results from a sequential control module 206 or other resource. In this example, the information and options may include a table 602 of entries 604 identifying the user-defined report parameters for the phase function block 212.

The report parameters defined in the entries 604 could include the following fields, each of which may or may not appear in FIG. 6. A parameter name represents a user-defined name for the report parameter in the table 602. A description represents a short description of the report parameter, and a data type defines the data type of the report parameter (such as real, string, Boolean, or enumeration). An enable flag indicates whether use of a report parameter is currently enabled or disabled. A value identifies the actual value of the report parameter. An engineering unit specifies the unit of measurement for the report parameter's value. A minimum value and a maximum value specify a range of allowable values for the report parameter. A trend flag indicates whether the trend of the report parameter's value should be tracked. A parameter reference defines the source of the report parameter, or the location where the parameter value is read from during results uploading (such as from a control module 208 via a sequential control module 206).

In particular embodiments, the same techniques described above with respect to the formula parameters can be used with the report parameters. For example, the same configuration and parameter population techniques could be used. Also, a limit (such as fifty) may or may not be imposed on the number of report parameters. In addition, a parameter definition editor can be used to define the report parameters.

Figure 7:
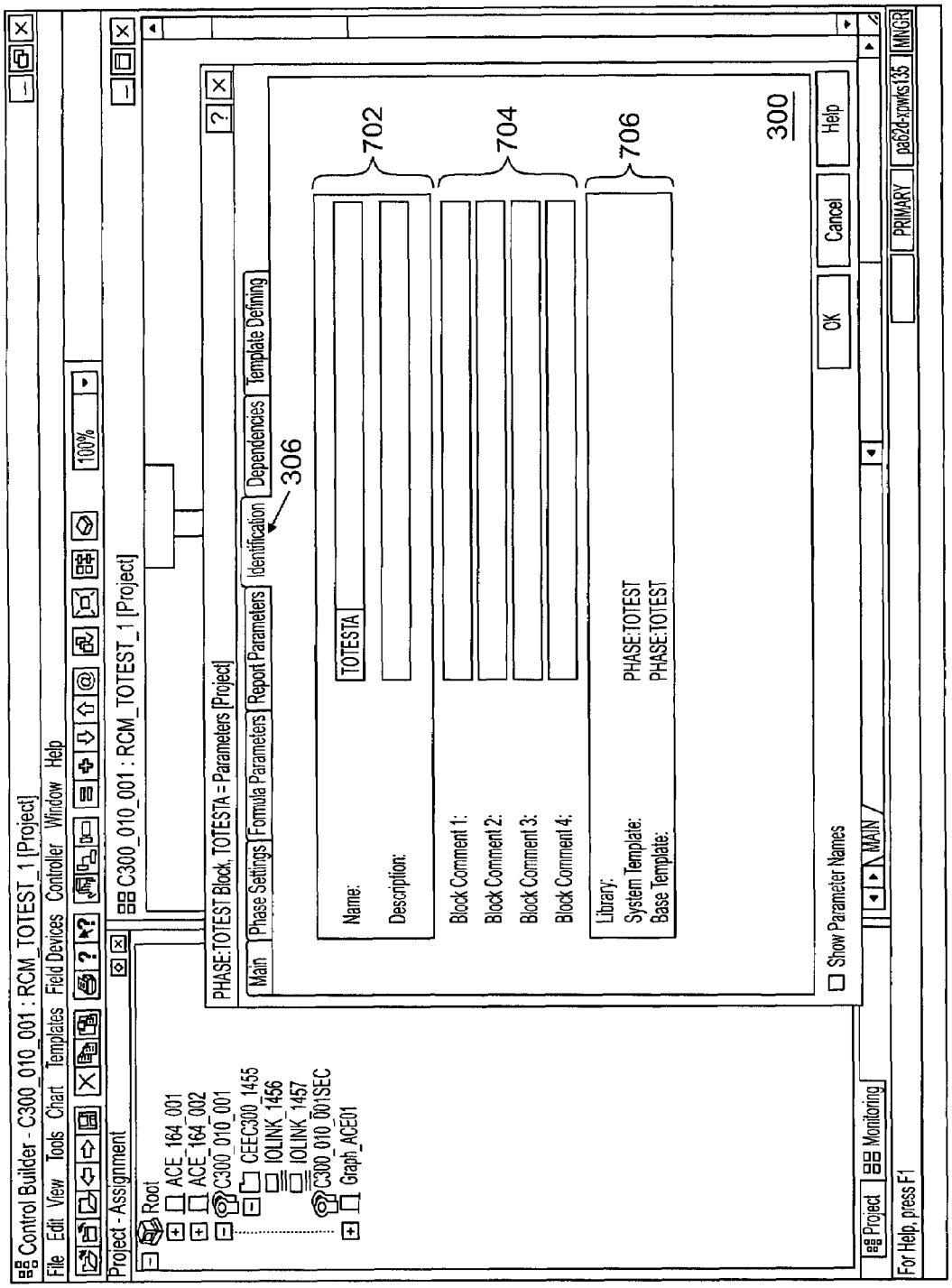

Selection of the "Identification" tab 306 in the form 300 presents the user with the information and options shown in FIG. 7. The information and options include two text boxes 702, which allow the user to define the resource name and description associated with a phase function block 212. This may be the same as the information provided in the text boxes 308-310 in FIG. 3. The information and options may also include multiple text boxes 704, which allow the user to provide various comments about the phase function block 212. In addition, the information and options may include library information 706, which identifies one or more templates associated with the phase function block 212.

Figure 8:
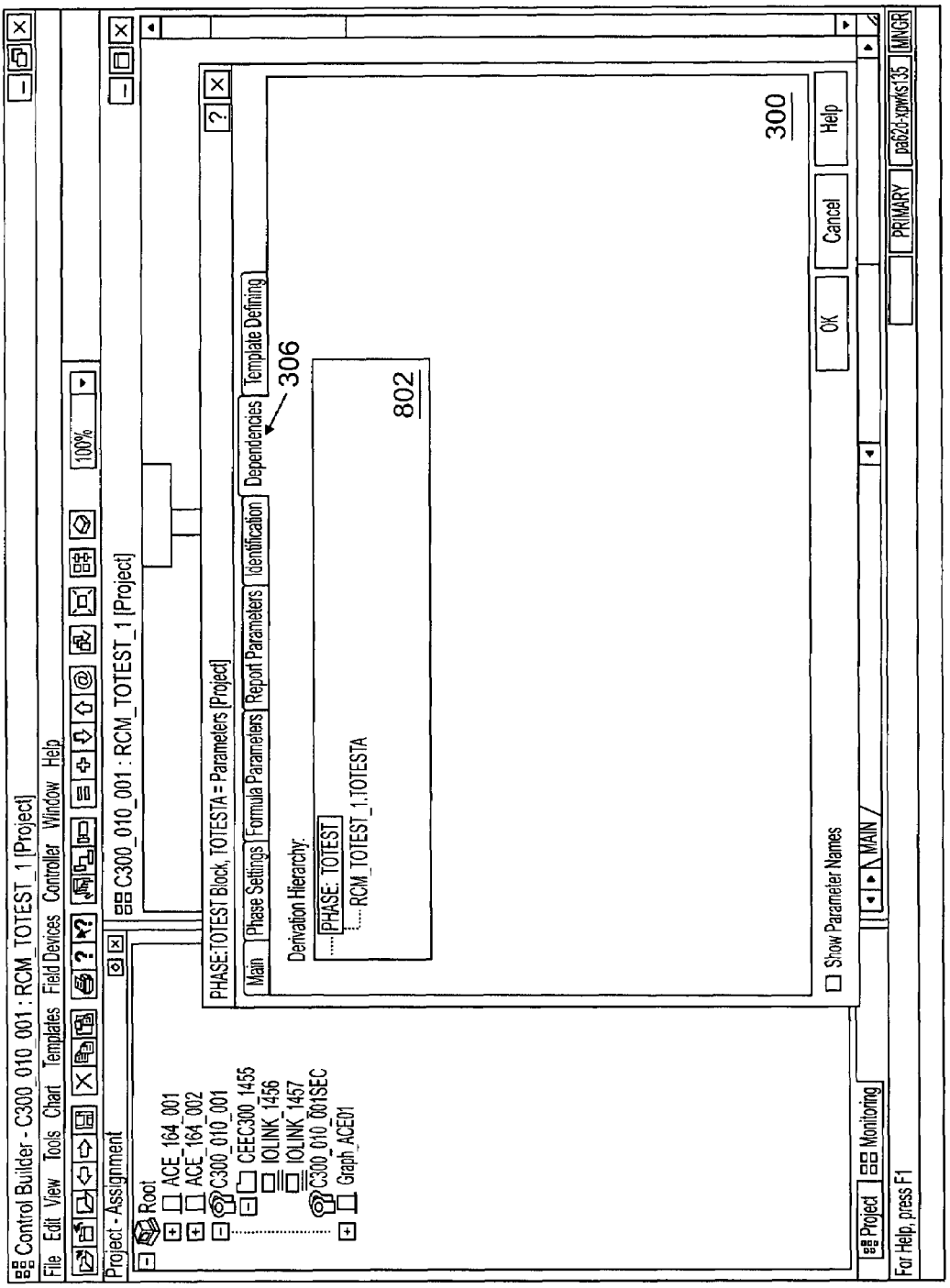

Selection of the "Dependencies" tab 306 in the form 300 presents the user with the information and options shown in FIG. 8. The information and options include a derivation hierarchy 802, which identifies one or more modules associated with the phase function block 212. In this example, the derivation hierarchy 802 identifies the recipe control module 204 in which the phase function block 212 resides.

Figure 9:
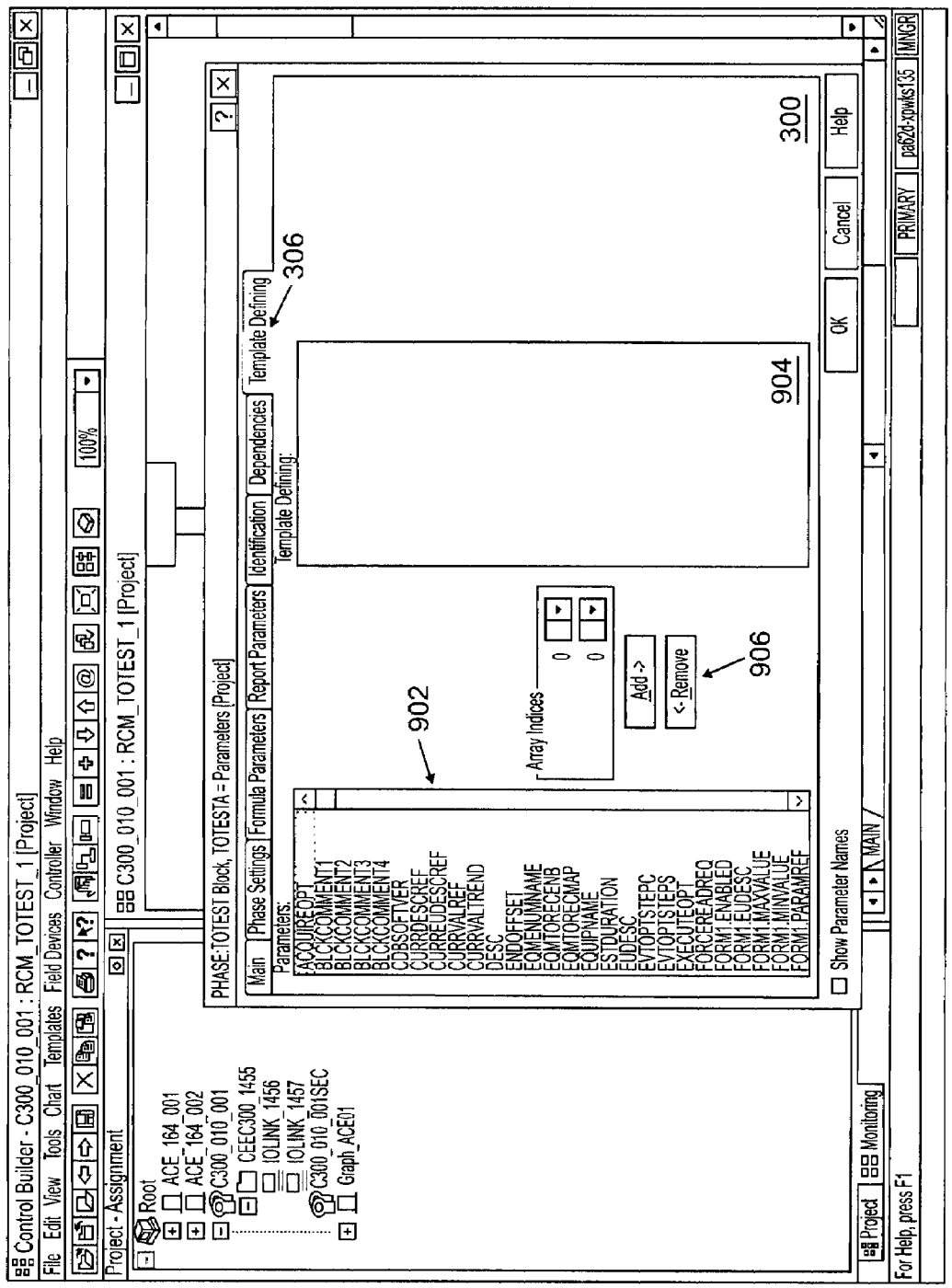

Selection of the "Template Defining" tab 306 in the form 300 presents the user with the information and options shown in FIG. 9. This includes a list 902 of parameters that can be selected and placed into a template defining area 904. Controls 906 can be used to move parameters from the list 902 into the template defining area 904 and vice versa. The controls 906 can also be used to define certain parameters as arrays. In general, the user can use the controls 906 to define a template, which controls the content of the other tabs 306 in the form 300.

Using the form 300, a user can successfully create or modify phase function blocks 212 in a process control system. For example, the user can define one or more phase function block types and create instances of the types (actual phase function blocks 212) for use in a recipe control module 204. The user can define each phase function block type's formula parameters, which are used to provide the necessary data to a sequential control module 206 so the sequential control module 206 can successfully interact with a control module 208 to implement a phase. The user can also define each phase function block type's report parameters, which are used to retrieve execution data from the sequential control module 206.

In some embodiments, a phase function block 212 may require one or multiple execution cycles to perform all actions required by its configuration. The number of cycles required may be dependent on several factors, including the equipment name provided in the text box 402, the options selected using the checkboxes 404, and the controller in which the controlled resource resides (which could involve a subscription period associated with peer-to-peer communications). In many cases, a phase function block 212 may require fewer cycles if the resource identified in the text box 402 (such as a sequential control module 206) is within the same CEE as the phase function block 212. If the resource resides in a different CEE, the same number of cycles might be achieved if the text box 402 is left blank. As examples, if within the same CEE, the phase function block 212 may require at least one execution cycle when the text box 402 is blank and two execution cycles when the text box 402 is not blank. If within different CEEs, a phase function block 212 may require one execution cycle when the text box 402 is blank, four execution cycles if the text box 402 is not blank and all checkboxes 404 are selected, and five execution cycles if the text box 402 is not blank and all checkboxes 404 are selected and formula parameters are used. Additional cycles may be required if the subscription period is higher than the SCM period or the RCM period, or if the SCM period is higher than the RCM period. By using the appropriate selections, the real-time behavior of the phase function blocks 212 can be controlled, supporting the use of the phase function blocks 212 in hard real-time process control systems.

In particular embodiments, a process control system could provide configuration status handling to verify the information provided by the user via the form 300. For example, the configuration status handling could involve verifying parameter definitions (such as by verifying a proper value for a formula parameter in light of its minimum value and maximum value). The configuration status handling could also detect unsupported configurations and flag unlikely configurations. In addition, execution status handling could be provided for the phase function block 212. The execution status handling could involve verifying parameter stores and reads, verifying SCM control, and verifying acquisition of a resource (such as an SCM).

Although FIGS. 3 through 9 illustrate one example of a form 300 used to configure a phase function block 212 in a process control system, various changes may be made to FIGS. 3 through 9. For example, the content and arrangement of the information and options in FIGS. 3 through 9 are for illustration only. The form 300 could include any other or additional information and options arranged in any manner, and the information and options shown in the form 300 could vary depending on the template defined for the form 300. Also, the specific information and options in the form 300 are for illustration only. The form 300 could allow the user to select or specify any other or additional parameters associated with a phase function block 212.

Figure 11:
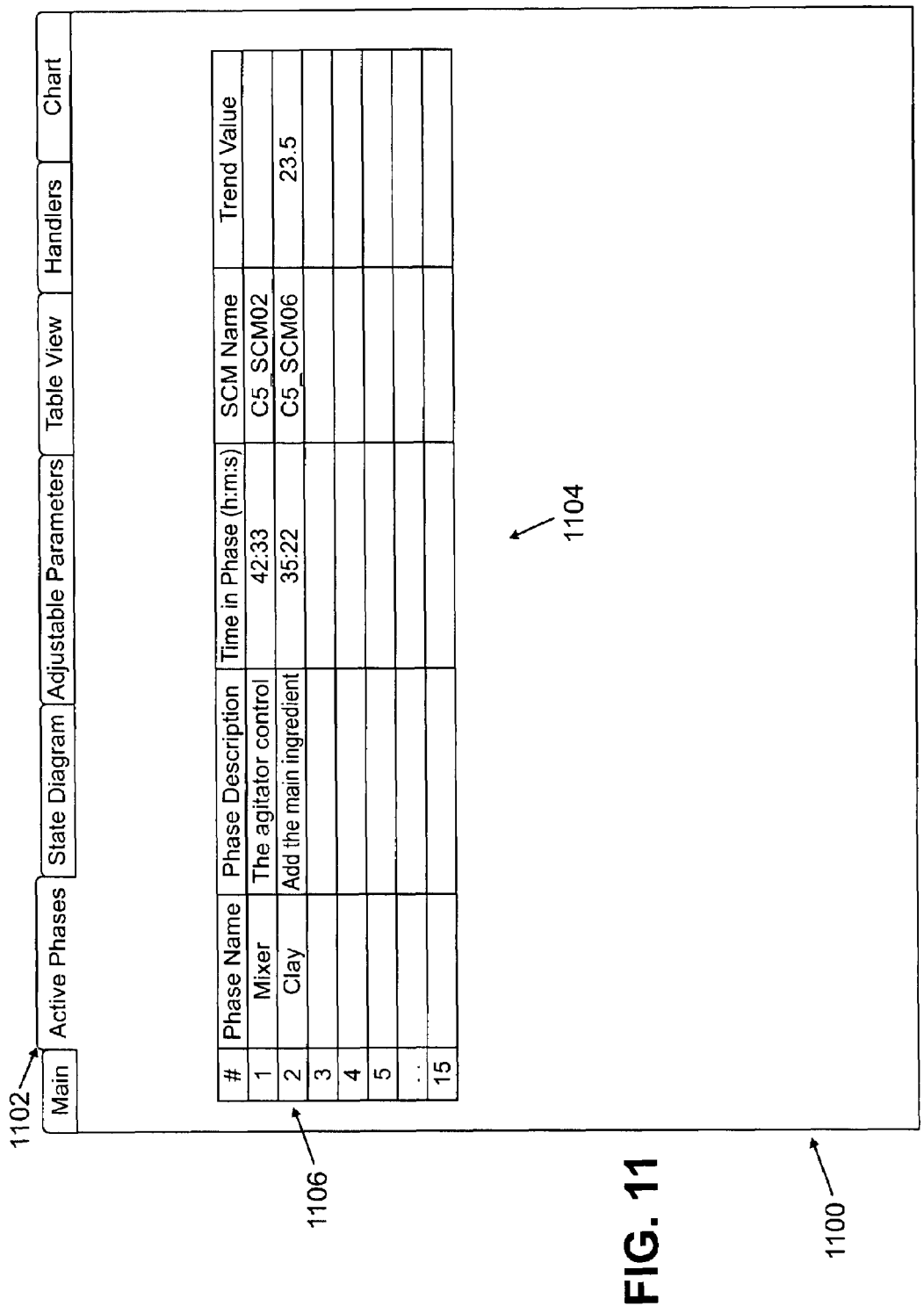
Figure 12:
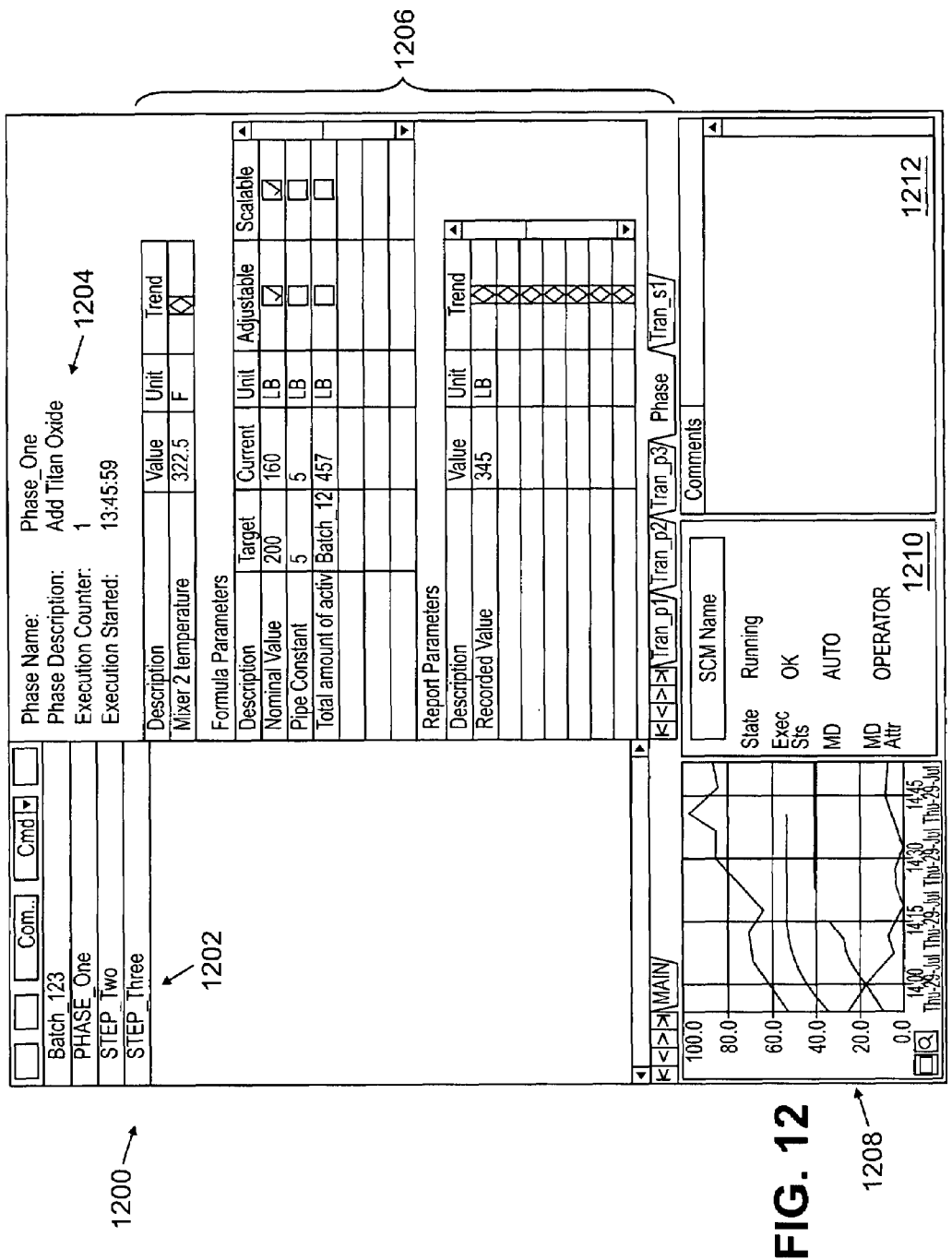

FIGS. 10 through 12 illustrate example forms used to configure and monitor a recipe control module 204 in a process control system in accordance with this disclosure. The forms shown in FIGS. 10 through 12 are for illustration only. Any other mechanism(s) could be used to configure and monitor recipe control modules. Also, for ease of explanation, the forms are described as being used to configure and monitor recipe control modules 204 in the process control system 200 of FIG. 2. The forms could be used with any other function blocks and systems.

As shown in FIG. 10, a form 1000 can be used to configure a recipe control module 204. In this example, the form 1000 includes various tabs 1002, which present different information and options to the user in the form 1000. Selection of the "Recipe Settings" tab 1002 presents the information and options shown in FIG. 10. The information and options include general recipe information 1004. The general recipe information 1004 includes a name of a unit control module 202 associated with the recipe control module 204. This is the unit control module 202 that the recipe control module 204 acquires before the recipe control module 204 is executed using the process unit 210 associated with the unit control module 202. The general recipe information 1004 also includes a batch identifier, a current batch size, a default batch size, and a batch size engineering unit. These fields are related to a batch of product produced using the recipe control module 204. A Mode Tracking field defines how the mode attribute of a sequential control module 206 or another recipe control module 204 is controlled by mode changes in this recipe control module 204.

In particular embodiments, the default value for the batch identifier could be the same as the recipe control module's tag name. The default values for the current batch size and the actual batch size could be 100, and the default for the batch size engineering unit could be percentage. The Mode Tracking could be set to none (no tracking), One Shot tracking (one mode change in RCM sent to SCM or other RCM), Continuous Tracking with Return (multiple mode changes in RCM sent to SCM or other RCM and vice versa), Semi-continuous Tracking (multiple mode changes in RCM sent to SCM or other RCM at intervals), and Continuous Tracking (multiple mode changes in RCM sent to SCM or other RCM). Also, the unit control module 202 could be selected before a control recipe can be downloaded into a controller.

State projection and propagation section 1006 provides default values controlling how one or more abnormal states in a resource are mapped to one or more states in the recipe control module 204 and vice versa. As noted above, these values can be overridden using the state projection section 408 and the state propagation section 410 for a phase function block.

In addition, two checkboxes 1008 identify whether the recipe control module 204 should release any resources allocated to its phases during normal or abnormal termination. By default, any resources acquired by the recipe control module 204 and its phases could be released automatically once the recipe control module 204 has reached a terminal state. If the same recipe control module 204 is executed multiple times, resources that are not explicitly released by its phases can remain acquired by the recipe control module 204 by unchecking one or both of the checkboxes 1008. These may be changed at runtime to allow the release of resources when the recipe control module 204 is reset to an idle state after normal or abnormal termination. In particular embodiments, only final SCM states (such as Aborted, non-terminal Stopped, and Held) may cause an internal exception event in the recipe control module 204. This may avoid uncertain behavior, such as when SCMs change from one transient state to another transient state. Also, if multiple SCMs cause an internal exception event, rules of precedence may apply, such as a rule specifying that the Abort state is the highest state and has priority.

As shown in FIG. 11, a form 1100 can be used to monitor execution of a recipe control module 204. In this example, the form 1100 includes various tabs 1102, which present different information and options to the user in the form 1100. Selection of the "Active Phases" tab 1102 presents the information and options shown in FIG. 11. The information and options include an active phase table 1104, which has an entry 1106 for each phase currently being executed in a process control system. In this example, each phase being executing in parallel is listed in the table 1104. An index, name, and description of each phase are included in the table 1104. The current execution length of each phase is also identified in the table 1104, along with the name of the resource (such as an SCM) involved in the phase. In addition, a trend value could be provided for one or more parameters of each phase.

Selection of one of the phases listed in the table 1104 could present a form 1200 as shown in FIG. 12 to the user. The form 1200 contains detailed information regarding the selected phase. As shown in FIG. 12, the form 1200 could include a navigation area 1202, which allows the user to view the various phases, the topology between phases, and the current states of the phases in a recipe control module 204. The form 1200 could also include general phase information 1204, such as the name, description, iteration, and start time of the phase. The form 1200 could further include detailed phase information 1206, such as values for various formula and report parameters and other parameters being monitored. Various ones of these parameters can be associated with different colors in the detailed phase information 1206, and historical values for these parameters can be plotted in a trend graph 1208. An SCM area 1210 identifies the state, execution status, mode, and mode attribute settings of the sequential control module 206 associated with the selected phase. A comments area 1212 allows users to add comments associated with the selected phase, and the comments could be stored for later use.

Although FIGS. 10 through 12 illustrate examples of forms used to configure and monitor a recipe control module 204 in a process control system, various changes may be made to FIGS. 10 through 12. For example, the content and arrangement of the information and options in FIGS. 10 through 12 are for illustration only. The forms could include any other or additional information and options arranged in any manner. Also, the specific information and options in the forms are for illustration only. The forms could allow the user to select, specify, or view any other or additional parameters associated with a recipe control module 204.

Figure 13:
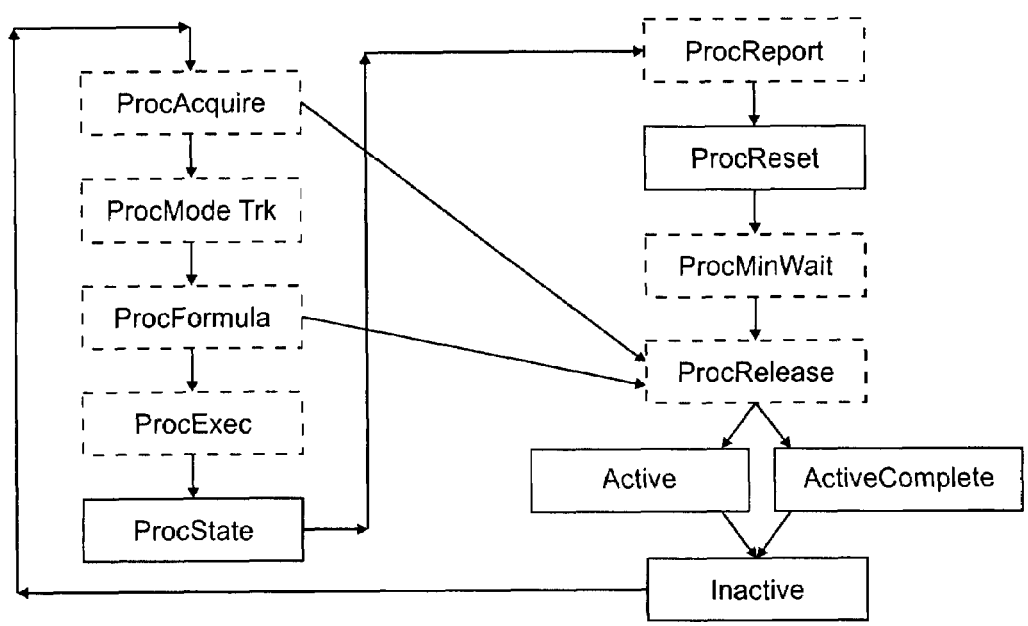
FIG. 13 illustrates an example state model for a phase function block in a process control system in accordance with this disclosure.

FIG. 13 illustrates an example state model 1300 for a phase function block 212 in a process control system in accordance with this disclosure. The embodiment of the state model 1300 shown in FIG. 13 is for illustration only. Other embodiments of the state model 1300 could be used without departing from the scope of this disclosure. Also, for ease of explanation, the state model 1300 is described with respect to the phase function blocks 212 operating in the process control system 200 of FIG. 2. The state model 1300 could be used by any other function blocks and in any other system.

In general, the state model 1300 may be compatible with an internal state model of the sequential control module 206. The state model 1300 also includes additional states due to the distinct functions of the phase function block 212. In FIG. 13, the states in dashed lines may be passed within a single processing cycle (such as when processing takes place within a single control execution environment) and may therefore not be visible to the user.

In some embodiments, a phase function block 212 may perform (among other things) the following tasks during execution through its parent recipe control module 204:
  Acquire a sequential control module 206;
  Set the mode attribute of the SCM;
  Download phase formula parameters to the SCM;
  Command the SCM to begin execution;
  Monitor SCM execution;
  Perform state tracking and propagation when the parent RCM or the linked SCM goes into an abnormal state;
  Upload report parameters;
  Reset the SCM (if it is configured to wait until the SCM reaches a terminal state);
  Release the SCM (if it is configured to do so); and
  Generate events to report the details of its execution when executed.

Upon the start of execution, a phase function block 212 may ask its container recipe control module 204 to acquire a sequential control module 206 (by transmitting an arbitration request to the sequential control module 206) if it is not already acquired. While acquiring the sequential control module, the state of the phase function block 212 may change to ProcAcquire. Once the sequential control module 206 is acquired, the state of the phase function block 212 may transition to ProcModeTrk, and the phase function block 212 may continue execution.

While in the ProcModeTrk state, the phase function block 212 may check the mode attribute of the sequential control module 206. If the mode attribute is Program, the phase function block 212 may begin formula parameter downloading. If the mode attribute is not Program and Mode Tracking is enabled (Mode Tracking=One Shot, Semi-Continuous, Continuous Tracking with Return, or Continuous Tracking), the phase function block 212 may set the mode attribute of the sequential control module 206 to Program and begin formula parameter downloading. If the mode attribute is not Program and Mode Tracking is disabled (Mode Tracking=None), the phase function block 212 may wait until the mode attribute of the sequential control module 206 changes to Program.

Once mode tracking is completed, the phase function block 212 may start the next task, formula parameter store, and the state of the phase function block 212 transitions to ProcFormula. While in the ProcFormula state, the phase function block 212 stores formula parameter values to the sequential control module 206 or other destination blocks. The phase function block 212 may read the value of a formula parameter from the value field in the table 502 and write the value to the destination parameter specified in the parameter reference field. The phase function block 212 could then wait for the status of the parameter download from the destination block.

If a parameter download fails (once or multiple times), the parameter downloading may stop, and the phase function block's execution status may change to Fail. If the parameter download is successful, the next formula parameter can be downloaded. In some embodiments, the phase function block 212 could generate an event for each of the formula parameter downloads, and the value of each formula parameter can be recorded to an event journal along with the event.

When all formula parameters are successfully downloaded, the phase function block 212 may transition to the ProcExec state and issue a Start command to the sequential control module 206. The sequential control module 206 may start executing when it receives the Start command from the phase function block 212. The phase function block 212 then monitors the execution of the sequential control module 206 and projects the key execution information of the sequential control module 206. Once execution of the sequential control module 206 is complete or reaches to a terminal state (Aborted or terminal Stopped), the state of the phase function block 212 transitions to ProcState and then to ProcReport. In the ProcReport state, the phase function block 212 retrieves data from the source that is defined in the report parameter reference field (the data source is normally an SCM parameter but can be a parameter in another block) and saves the data to the value field defined in the table 602. In some embodiments, the values of the report parameters are also recorded in the event journal with each report parameter uploading event.

Once the report parameter uploading is completed, the phase function block 212 transitions to the ProcReset state. In the ProcReset state, the phase function block 212 may give a Reset command to the sequential control module 206 to bring it to the Idle state. The phase function block then transitions to the ProcMinWait state (in which the phase function block 212 waits for a configured minimum time to expire) and then transitions to the ProcRelease state. In the ProcRelease state, the phase function block 212 releases the sequential control module 206. The phase function block 212 then transitions to the Active state to complete the execution. While executing, the phase function block 212 can optionally generate start, end, control start, control end, acquire, release, and state change events to the event journal.

Table 1 describes the various states contained in the state model 1300.

TABLE 1

| State | Description | Type | Remarks |
|---|---|---|---|
| Inactive | Phase step inactive | Initial and final | |
| ProcAcquire | Phase step acquiring resource | Transient | Acquisition of the resource (if defined) occurs |
| ProcModeTrk | Phase step checking and, if necessary, setting or waiting for proper mode attribute | Transient | |
| ProcFormula | Phase step writing formula parameters | Transient | Storage of formula parameters to destinations (if defined) occurs |
| ProcExec | Phase step writing SCM command | Transient | Writing of SCM command structure (if defined) |
| ProcState | Waiting for SCM completion | Transient | SCM is executing under control of recipe |

TABLE 1-continued

| State | Description | Type | Remarks |
|---|---|---|---|
| ProcReport | Processing report parameters | Transient | Report parameters are read |
| ProcReset | Resetting SCM | Transient | |
| ProcMinWait | MinWait processing | Transient | Wait for minimum wait time to be reached |
| ProcRelease | Releasing resource | Transient | Release the acquired resource |
| Active | Phase step active | Final | |
| ActiveComplete | Phase step active and last step of handler | Final | |

Table 2 defines the various transitions between states in the state model 1300.

TABLE 2

| From | To | When | Remarks |
|---|---|---|---|
| Inactive | ProcAcquire | Phase step becomes activated by RCM | Caused by RCM execution algorithm |
| ProcAcquire | ProcModeTrk | Phase step has acquired resource | (acqstate = acquired) OR (no resource specified) |
| ProcAcquire | ProcRelease | Recipe wants to abort | |
| ProcModeTrk | ProcFormula | Mode attribute is or can be set to Program | |
| ProcFormula | ProcExec | Formula parameter stores are completed successfully | (stores complete) OR (no parameter destinations defined) |
| ProcFormula | ProcRelease | Recipe wants to abort | |
| ProcExec | ProcState | SCM was commanded | Store of SCM command structure complete |
| ProcState | ProcReport | SCM reached terminal state | (SCM.state = terminal) OR (Do not wait for terminal) |
| ProcReport | ProcReset | Report parameter processing complete | Read of report parameters complete |
| ProcReset | ProcMinWait | SCM has been reset | (SCM.state = Idle, Checking, or Inactive) OR (Do not wait for terminal) |
| ProcMinWait | ProcRelease | MinWait processing is complete | Minimum wait time is reached or exceeded |
| ProcRelease | Active | MinWait processing is complete AND nNext > 0 | ((acqstate = none) OR (no resource specified) OR (Do not release after use)) AND (Phase step has successor steps) |
| ProcRelease | ActiveComplete | Resource has been released AND nNext = 0 | ((acqstate = none) OR (no resource specified) OR (Do not release after use)) |

TABLE 2-continued

| From | To | When | Remarks |
|---|---|---|---|
| Active | Inactive | Phase step becomes passified by RCM | AND (Phase step has no successor steps) Caused by RCM execution algorithm |
| ActiveComplete | Inactive | Phase step becomes passified by RCM | Caused by RCM execution algorithm |

Here, if the MinWait processing does not exist or is configured to zero, then the MinWait processing may always be considered complete. Also, a phase function block 212 may not act on an SCM state if the SCM's mode attribute is not set to Program (which could include unreadable or invalid values for the mode attribute).

As part of the ProcFormula state, formula parameters whose use is enabled (enable flags in table 502 set to true) may be stored to their target references (if not Null). If a formula parameter's value is a reference, the reference parameter may be read before storage. Scaling can be applied if configured, and processing could start for all parameters in the same cycle in the order configured. If all parameters are within the same control execution environment and no errors occur, all parameter processing could occur in the same execution cycle. If references are peer-to-peer (either for read or write), processing of the parameters may complete in a different order than specified and may take multiple cycles. The ProcExec state may be reached if and when all formula parameter processing is completed successfully.

In some embodiments, to support automatic recovery from temporary communication errors without creating excessive load on the infrastructure and allowing some user response within that time, failed store attempts may be repeated. For example, a failed store attempt could be repeated six times, waiting ten execution cycles between repeats. However, these values could be modifiable in code, such as by using different tuning constants for different CEE platforms. During the repeated attempts, the execution status of the phase function block 212 may be set to Warning and then to Error if the phase function block 212 gives up.

The phase function block 212 may scale a formula parameter at the time when a parameter store is attempted (i.e. after phase activation). The phase function block 212 need not maintain a local copy of the batch scale, but can use the actual scale value from the recipe control module 204. The recipe control module 204 may control if and when changes of the scale parameter are allowed.

In particular embodiments, no special packing for SCM formula parameters or by any other criteria is done, and all formula parameters are processed independently (every parameter has a connection). Also, an execution status may reflect the processing results. To recover from failed stores, the phase function block's state may change to the ProcState state if the SCM changes its state to Running, Complete, Aborting, Aborted, Stopping, Stopped, Holding, Held, Interrupting, or Restarting. This allows a user to recover from this situation without aborting the recipe control module 204.

While in the ProcReport state, report parameters whose use is enabled (enable flags in table 602 set to true) may be read from their source references (if not Null). Processing may begin for all of the report parameters in the same cycle in the order configured. If references are peer-to-peer, processing of the report parameters may complete in a different order than specified and may take multiple cycles. The ProcReset State may be reached if and when all report parameter processing is completed successfully.

In particular embodiments, an execution status may reflect the processing results. To recover from failed reads of the results, the phase function block's state may change to ProcMinWait if the SCM changes state to Idle, Checking, or Inactive. This allows a user to recover from this situation without aborting the recipe control module 204.

During execution of a phase function block 212, the phase function block 212 may interact with a sequential control module 206. In some embodiments, all phase steps may remain active even when a recipe control module 204 is placed in the Hold state. Table 3 summarizes, for a particular embodiment, the possible phase function block-sequential control module communications during the ProcExec state.

TABLE 3

| SCM State | Command Sent by Phase to SCM | New Phase State | Remarks |
|---|---|---|---|
| Idle | Start | ProcState | Start command may be skipped (and may not be repeatable) |
| Held | Restart | ProcState | |
| Non-terminal Stopped | Hold | ProcExec | |
| All other states | n/a | ProcExec | Wait for another state |

Here, the same phase function block 212 may not provide two consecutive Start commands. An internal start command counter may be reset when the phase function block 212 is in the Inactive state.

Table 4 summarizes, for a particular embodiment, the possible phase function block-sequential control module communications during the ProcState state (where the "Recipe to SCM State Propagation" is defined with SCM Command=Abort).

TABLE 4

| SCM State | Command Sent by Phase to SCM | New Phase State | Remarks |
|---|---|---|---|
| Running, Interrupting, Restarting, Holding, Held, non-terminal Stopping, non-terminal Stopped | Abort | ProcState | |
| Complete, terminal Stopped, Aborted | None | ProcReport | No command needs to be given to the SCM |
| All other states | n/a | ProcState | Wait until the SCM state changes |

Table 5 summarizes, for a particular embodiment, the possible phase function block-sequential control module communications during the ProcState state (where the "Recipe to SCM State Propagation" is defined with SCM Command=Stop).

TABLE 5

| SCM State | Command Sent by Phase to SCM | New Phase State | Remarks |
|---|---|---|---|
| Running, Interrupting, Restarting, Holding, Held | Stop | ProcState | |
| Interrupted, Restarted, any Stopping, Aborting | n/a | ProcState | Wait until the SCM state changes |
| All other states | None | ProcReport | No command needs to be given to the SCM |

Table 6 summarizes, for a particular embodiment, the possible phase function block-sequential control module communications during the ProcState state (where the "Recipe to SCM State Propagation" is defined with SCM Command=Hold).

TABLE 6

| SCM State | Command Sent by Phase to SCM | New Phase state | Remarks |
|---|---|---|---|
| Running, Interrupting, non-terminal Stopped | Hold | ProcState | |
| Interrupted, Restarting, Restarted, Holding, any Stopping, Aborting | n/a | ProcState | Wait until the SCM state changes |
| All other states | None | ProcState | No command needs to be given to the SCM |

Table 7 summarizes, for a particular embodiment, the possible phase function block-sequential control module communications during the ProcState state (where the recipe control module 204 performs a Restart).

TABLE 7

| SCM State | Command Sent by Phase to SCM | New Phase State | Remarks |
|---|---|---|---|
| Idle | Start | ProcState | Start command may be skipped (and may not be repeatable) |
| Held | Restart | ProcState | |
| Non-terminal Stopped | Hold | ProcState | |
| All other states | n/a | ProcState | |

Table 8 summarizes, for a particular embodiment, the possible phase function block-sequential control module communications during the ProcReset state.

TABLE 8

| SCM State | command sent by Phase to SCM | new Phase state | Remarks |
|---|---|---|---|
| Complete, terminal Stopped, Aborted | Reset | ProcReset | |
| Running, Interrupting, Restarting, Holding, Held, non-terminal Stopping, non-terminal Stopped | Abort | ProcReset | |
| Interrupted, Restarted, terminal Stopping, Aborting | None | ProcReset | Wait until the SCM state changes |
| All other states | n/a | ProcRelease | |

As noted above, a phase function block 212 may contain a requester object or requester function block, which can be used to acquire resource function blocks associated with resources (such as sequential control modules 206 or unit control modules 202). The phase function block 212 may command the requester object to acquire a resource when the phase function block 212 is activated. The phase function block 212 may also command the requester object to release the resource when the phase function block 212 becomes inactive. In some embodiments, there may be no other interaction between the phase function block 212 and its associated requester object. Table 9 summarizes, for a particular embodiment, the possible phase function block-requester object communications during the ProcAcquire state. Processing may be skipped with an immediate transition to the ProcFormula state if no resource is specified.

TABLE 9

| Acquisition State | Command Sent to Requester Object | New Phase State | Remarks |
|---|---|---|---|
| None, Error | REQIN = true | ProcAcquire | |
| Acquired | None | ProcFormula | |
| All other states | None | ProcExec | Wait for another state |

Table 10 summarizes, for a particular embodiment, the possible phase function block-requester object communications during the ProcRelease state.

TABLE 10

| Acquisition State | Command Sent to Requester Object | New Phase State | Remarks |
|---|---|---|---|
| Acquired, Error | RELIN = true | ProcRelease | |
| None | None | Active OR ActiveComplete | |
| All other states | None | ProcRelease | Wait for another state |

Here, the parameters REQIN and RELIN may not be used externally and are used to describe internal activity between the phase function block 212 and an embedded resource object.

In some embodiments, a resource (such as a sequential control module 206) may or may not be required to reach a terminal state (such as a Completed, Aborted, or terminal Stopped state) before a phase function block 212 is completed. For example, Table 11 illustrates different possible configurations or operations of a phase function block 212.

TABLE 11

| Release Resource After Use | Wait for Terminal State | Remarks |
| --- | --- | --- |
| No | No | Resource left running and kept acquired by phase |
| No | Yes | Resource reused by phase |
| Yes | No | Resource left running and released by phase |
| Yes | Yes | Resource no longer running and released by phase upon phase completion |

In particular embodiments, if the resource does not need to reach a terminal state before a phase function block 212 completes, reporting of the report parameters could be skipped, or the report parameters could be reported as soon as an SCM Start command is issued.

In addition, Table 12 illustrates the functional power of the phase function block 212 that results from the free and mostly independent combination of its major sub-functions.

TABLE 12

| Name | Acquire Resource before Execution | Execute on the Resource | Wait for Terminal State | Release Resource after Execution | Remark |
| --- | --- | --- | --- | --- | --- |
| None | No | No | No | No | NULL-step |
| None | x | x | x | Yes | Error (not possible) |
| None | No | No | Yes | No | Info (ignored) |
| None | x | Yes | x | x | Error (not possible) |
| None | Yes | x | x | x | Error (not possible) |
| SCM/RCM | No | No | No | No | Info (Equipment ignored) |
| SCM/RCM | No | YES | x | x | Warn (recipe may get blocked); Hint: Acquire = Yes avoids this |
| SCM/RCM | No | No | YES | x | Info (recipe may get blocked) |
| SCM/RCM | Yes | No | No | No | OK, only acquire resource |
| SCM/RCM | No | No | No | Yes | OK, only release resource |
| SCM/RCM | Yes | No | No | Yes | Warn (SCM configured but not executed) |
| SCM/RCM | Yes | No | Yes | x | Info (recipe may get blocked) |
| SCM/RCM | Yes | Yes | No | No | OK, leave running and acquired |
| SCM/RCM | Yes | Yes | No | Yes | OK, leave running after release |
| SCM/RCM | Yes | Yes | Yes | No | OK, keep acquired |

TABLE 12-continued

| Name | Acquire Resource before Execution | Execute on the Resource | Wait for Terminal State | Release Resource after Execution | Remark |
| --- | --- | --- | --- | --- | --- |
| SCM/RCM | Yes | Yes | Yes | Yes | Default; general purpose SCM control and execution; recipe nesting |
| UCM | Yes | No | No | x | OK, Acquire |
| UCM | x | No | No | Yes | OK, Release |
| UCM | x | Yes | x | x | Error (not possible) |
| UCM | x | x | Yes | x | Info (will be ignored) |
| CM.ResFB | Yes | No | No | x | OK, Acquire |
| CM.ResFB | x | No | No | Yes | OK, Release |
| CM.ResFB | x | Yes | x | x | Error (not possible) |
| CM.ResFB | x | x | Yes | x | Info (will be ignored) |

Here, a value of "x" in a table entry means it does not matter what the value is in that entry, and the value "CM.ResFB" refers to a control module 208 incorporating a resource function block. Also, if multiple lines apply, the line with the worst status could take precedence.

Although FIG. 13 illustrates one example of a state model 1300 for a phase function block 212 in a process control system, various changes may be made to FIG. 13. For example, the state model 1300 could include any other or additional states and transitions depending on particular needs.

FIGS. 14A through 23C illustrate example interactions between a recipe control module 204, a phase function block 212, and a sequential control module 206 in a process control system in accordance with this disclosure. The interactions shown in FIGS. 14A through 23C are for illustration only. These components could interact in any other or additional ways without departing from the scope of this disclosure. Also, for ease of explanation, these interactions are described with respect to particular components in the process control system 200 of FIG. 2. These interactions could occur between any other components and in any other system.

In general, the interactions shown in FIGS. 14A through 23C are listed according to time slices, which are used for reference purposes only. For each time slice, FIGS. 14A through 23C may identify an event (such as a command) associated with a recipe control module 204, a state of the recipe control module 204, an event associated with a phase function block 212, a state of a sequential control module 206, and an event associated with the sequential control module 206. The solid arrows in FIGS. 14A through 23C illustrate the effects directly caused by commands, the dashed arrows illustrate the effects caused by information transfers (such as an update of a state change in one component causing a state change in another component), and pairs of half-arrows illustrate internal state transitions. In addition, the recipe control module 204 and phase function block 212 are said to reside at an upper level, and the sequential control module 206 is said to reside at a lower level. An abort initiated by the recipe control module 204 therefore represents an upper level abort, and an abort initiated by the sequential control module 206 represents a lower level abort.

Figure 14A:
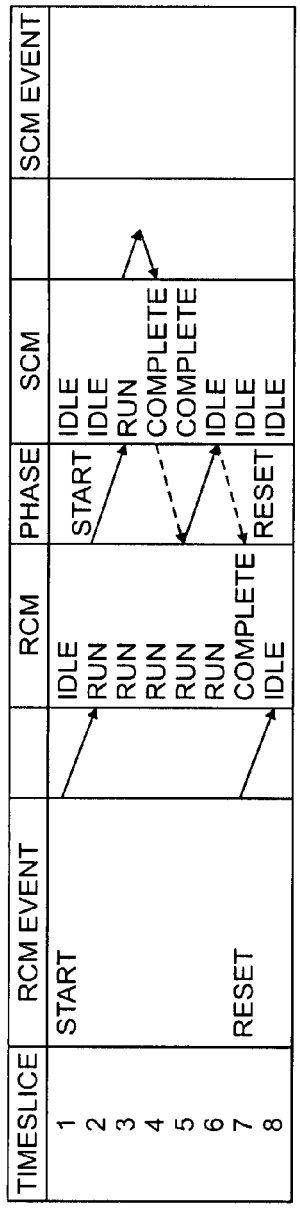
Figure 14B:
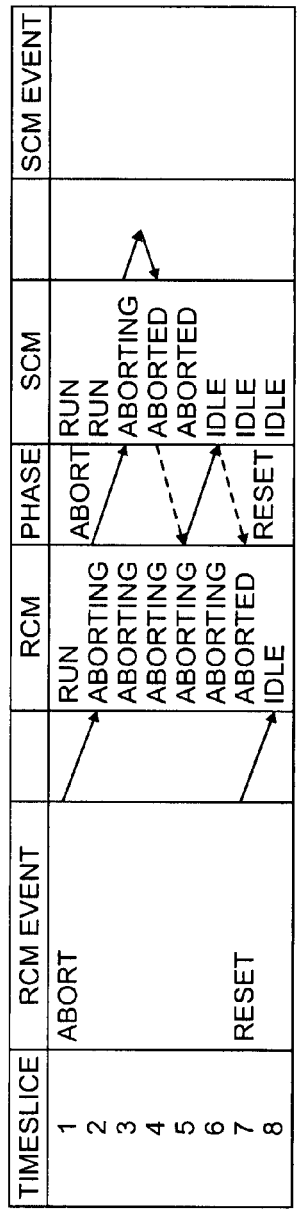
Figure 14C:
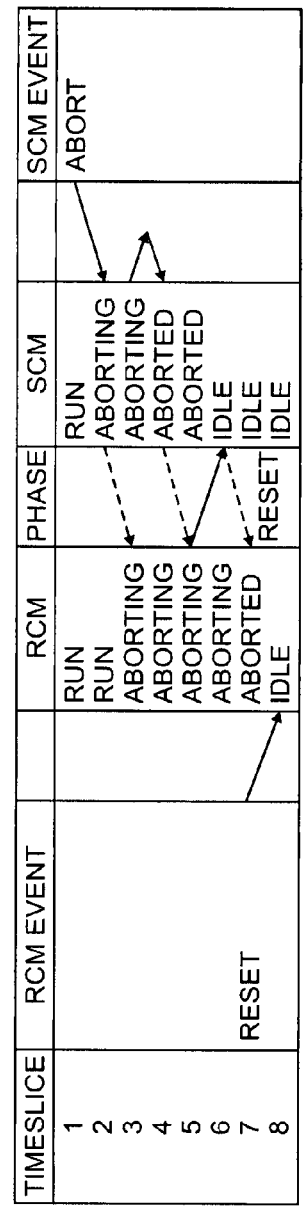

FIGS. 14A through 14C illustrate the interactions between the recipe control module 204, the phase function block 212, and the sequential control module 206 in a general-purpose situation. It is assumed that the second and third checkboxes 404 in FIG. 4 are selected (turned on). It is also assumed that the Abort state of the recipe control module 204 is mapped to the Abort state of the sequential control module 206 and vice versa. In this example, FIG. 14A illustrates the interactions during normal execution, FIG. 14B illustrates the interactions during an upper level abort, and FIG. 14C illustrates the interactions during a lower level abort.

FIGS. 15A through 15C illustrate the interactions when an aborted sequential control module 206 leads to a holding state in the recipe control module 204. In other words, the Abort state of the recipe control module 204 is mapped to the Abort state of the sequential control module 206, but the Abort state of the sequential control module 206 is mapped to the Hold state of the recipe control module 204. It is assumed that the second and third checkboxes 404 in FIG. 4 are selected (turned on). Here, FIG. 15A illustrates the interactions during normal execution, FIG. 15B illustrates the interactions during an upper level abort, and FIG. 15C illustrates the interactions during a lower level abort.

Figure 16A:
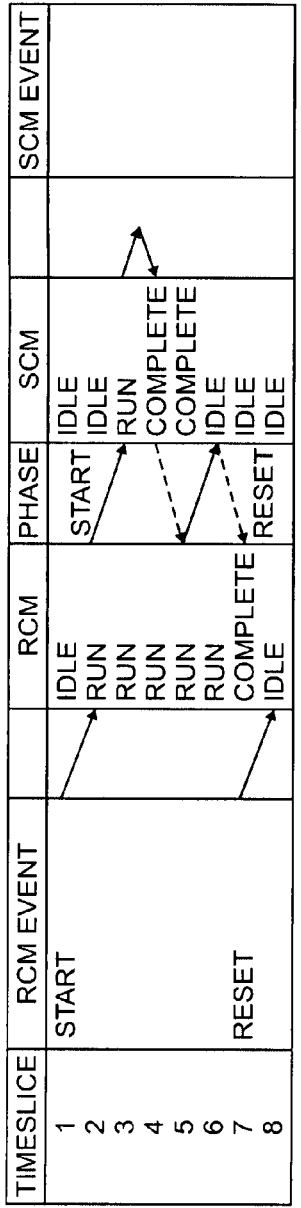
Figure 16B:
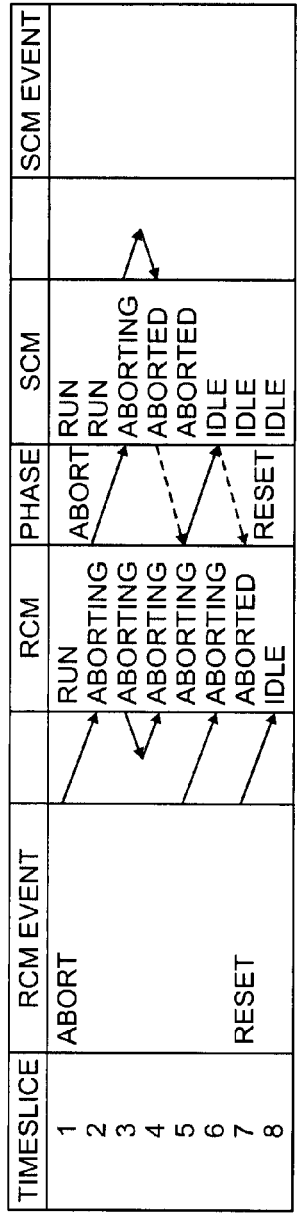
Figure 16C:
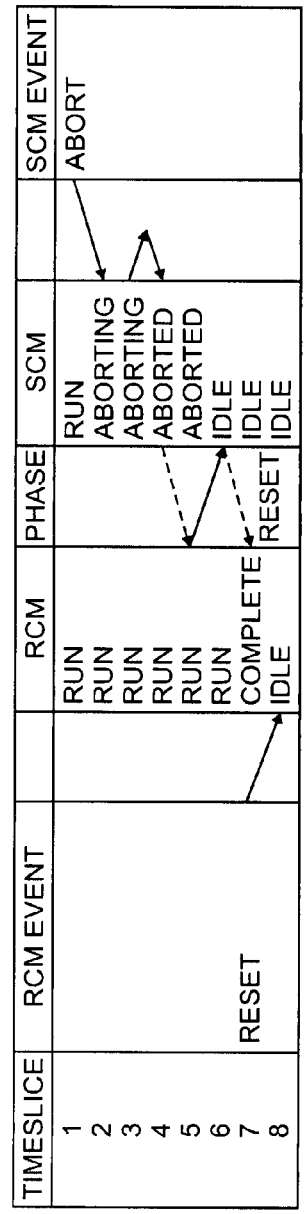

FIGS. 16A through 16C illustrate the interactions when there is no bottom-up (SCM-to-RCM) propagation of abnormal states. In other words, the Abort state of the recipe control module 204 is mapped to the Abort state of the sequential control module 206, but the Abort state of the sequential control module 206 is not mapped to a state of the recipe control module 204. It is assumed that the second and third checkboxes 404 in FIG. 4 are selected (turned on). In this example, FIG. 16A illustrates the interactions during normal execution, FIG. 16B illustrates the interactions during an upper level abort, and FIG. 16C illustrates the interactions during a lower level abort. In FIG. 16C, the sequential control module 206 is aborted early, and the recipe control module 204 does not enter any abnormal handling (it runs to successful completion) because of the lack of state propagation. As a result, this configuration may not be used when a Complete state of the recipe control module 204 is interpreted as the successful completion of the phases.

FIGS. 17A through 17C illustrate the interactions when there is no top-down (RCM-to-SCM) propagation of abnormal states. In other words, the Abort state of the sequential control module 206 is mapped to the Abort state of the recipe control module 204, but the Abort state of the recipe control module 204 is not mapped to a state of the sequential control module 206. It is assumed that the second and third checkboxes 404 in FIG. 4 are selected (turned on). Here, FIG. 17A illustrates the interactions during normal execution, FIG. 17B illustrates the interactions during an upper level abort, and FIG. 17C illustrates the interactions during a lower level abort. In FIG. 17B, the recipe control module 204 aborts the sequence early, but the sequential control module 206 does not enter any abnormal handling because of the lack of state propagation. As a result, intervention may be required to halt execution of the sequential control module 206, or the sequential control module 206 may execute to completion.

FIGS. 18A through 18C illustrate the interactions when the sequential control module 206 is initiated and left running (no further interaction is required). It is assumed that the second checkbox 404 in FIG. 4 is selected (turned on) and the third checkbox 404 in FIG. 4 is not selected (turned off). Also, there is no mapping of the Abort states between the recipe control module 204 and the sequential control module 206. In this example, FIG. 18A illustrates the interactions during normal execution, FIG. 18B illustrates the interactions during an upper level abort, and FIG. 18C illustrates the interactions during a lower level abort.

FIGS. 19A through 19C illustrate the interactions when the recipe control module 204 is waiting for the sequential control module 206 to terminate. This may be the complement to the scenario illustrated in FIGS. 18A through 18C. It is assumed that the second checkbox 404 in FIG. 4 is not selected (turned off) and the third checkbox 404 in FIG. 4 is selected (turned on). Also, there is no mapping of the Abort states between the recipe control module 204 and the sequential control module 206. Here, FIG. 19A illustrates the interactions during normal execution, FIG. 19B illustrates the interactions during an upper level abort, and FIG. 19C illustrates the interactions during a lower level abort.

FIGS. 20A through 20C illustrate the interactions when no sequential control module 206 is specified and the phase function block 212 is used only for resource management or formula/report parameter processing. It is assumed that the second and third checkboxes 404 in FIG. 4 are not selected (turned off). Also, there is no mapping of the Abort states between the recipe control module 204 and any sequential control modules 206. In this example, FIG. 20A illustrates the interactions during normal execution, FIG. 20B illustrates the interactions during an upper level abort, and FIG. 20C illustrates the interactions during a lower level abort.

FIGS. 21A through 21C illustrate the interactions when no sequential control module 206 is specified and top-down propagation is ignored. It is assumed that the second and third checkboxes 404 in FIG. 4 are not selected (turned off). Also, the Abort state of the recipe control module 204 is mapped to the Abort state of a sequential control module 206 (although this may have no effect), but the Abort state of a sequential control module 206 is not mapped to a state of the recipe control module 204. Here, FIG. 21A illustrates the interactions during normal execution, FIG. 21B illustrates the interactions during an upper level abort, and FIG. 21C illustrates the interactions during a lower level abort.

FIGS. 22A through 22C illustrate the interactions when the recipe control module 204 has no control of a sequential control module 206. The recipe control module 204 may react to an abort from the sequential control module 206, but the recipe control module 204 may not reset the sequential control module 206. It is assumed that the second and third checkboxes 404 in FIG. 4 are not selected (turned off). Also, the Abort state of the recipe control module 204 is not mapped to a state of the sequential control module 206, but the Abort state of the sequential control module 206 is mapped to the Abort state of the recipe control module 204. In this example, FIG. 22A illustrates the interactions during normal execution, FIG. 22B illustrates the interactions during an upper level abort, and FIG. 22C illustrates the interactions during a lower level abort. In FIG. 22C, the transition in time slices one and two occurs because of a phase-to-phase transition. This means that the phase function block 212 controlling the sequential control module 206 becomes part of the current scope of execution and therefore reacts to the already aborted or aborting sequential control module 206.

FIGS. 23A through 23C illustrate the interactions when the recipe control module 204 does have control of the sequential control module 206. The recipe control module 204 may react to an abort of the sequential control module 206, and the recipe control module 204 may reset the sequential control module 206. It is assumed that the second and third checkboxes 404 in FIG. 4 are not selected (turned off). Also, the Abort state of the recipe control module 204 is mapped to the Abort state of the sequential control module 206 and vice versa. Here, FIG. 23A illustrates the interactions during normal execution, FIG. 23B illustrates the interactions during an upper level abort, and FIG. 23C illustrates the interactions during a lower level abort. In FIG. 23C, the transition in time slices one and two occurs because of a phase-to-phase transition. This means that the phase function block 212 controlling the sequential control module 206 becomes part of the current scope of execution and therefore reacts to the already aborted or aborting sequential control module 206.

Although FIGS. 14A through 23C illustrate examples of the interactions between a recipe control module 204, a phase function block 212, and a sequential control module 206 in a process control system, various changes could be made to FIGS. 14A through 23C. For example, any other or additional interactions could occur in the process control system.

FIGS. 24A through 24D illustrate example distributions of recipe control modules 204 in a process control system in accordance with this disclosure. The various distributions shown in FIGS. 24A through 24D are for illustration only. The recipe control modules 204 could be distributed in any other or additional ways.

In this example, unit recipes define production requirements for a unit in the process control system 100. A unit represents a collection of associated control modules and equipment modules (such as SCMs and CMs).

Figure 24A:
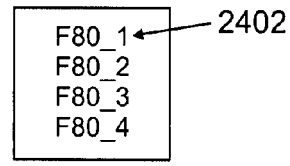
FIGS. 24A through 24D illustrate example distributions of recipe control modules in a process control system in accordance with this disclosure.
Figure 24B:
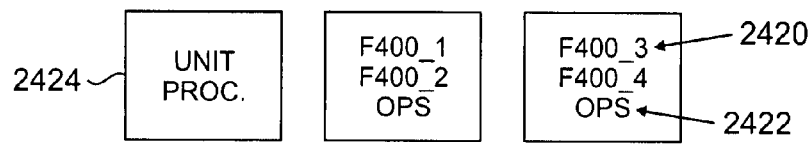
Figure 24C:
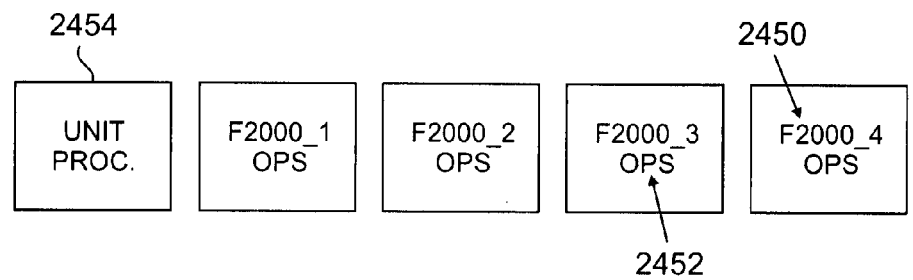
Figure 24D:
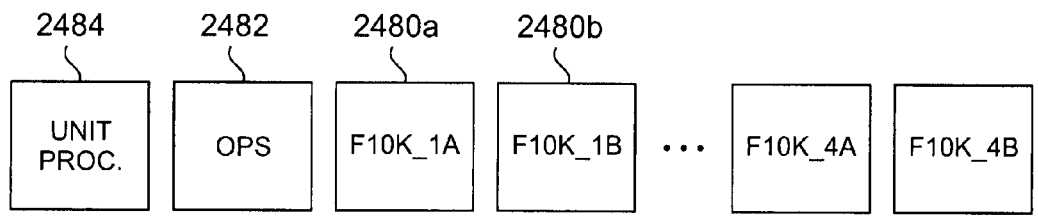

As shown in FIG. 24A, all unit recipes 2402 associated with the same class can be stored on a single controller. This single controller generally has access to all unit recipes, as well as a unit procedure defining the operations that need to be performed and an algorithm for initializing, organizing, and controlling these operations. In FIG. 24B, unit recipes 2420 associated with the same class are stored on multiple controllers. Each controller also has access to the operations 2422 associated with those unit recipes 2420. A unit procedure 2424 defining the overall procedure to be followed is stored on one of the controllers. As shown in FIG. 24C, each unit recipe 2450 is stored on a separate controller, along with its associated operations 2452. A unit procedure 2454 is stored on one of the controllers. In FIG. 24D, each unit recipe is distributed across multiple controllers (such as unit recipe 2480a-2480b). The operations 2482 and the unit procedure 2484 are also distributed and stored in separate controllers.

Although FIGS. 24A through 24D illustrate examples of the distributions of recipe control modules 204 in a process control system, various changes may be made to FIGS. 24A through 24D. For example, the divisions of the recipe control modules 204 into the components shown in FIGS. 24A through 24D are for illustration only. The recipe control modules 204 could be sub-divided and distributed in any other or additional manner.

Figure 25:
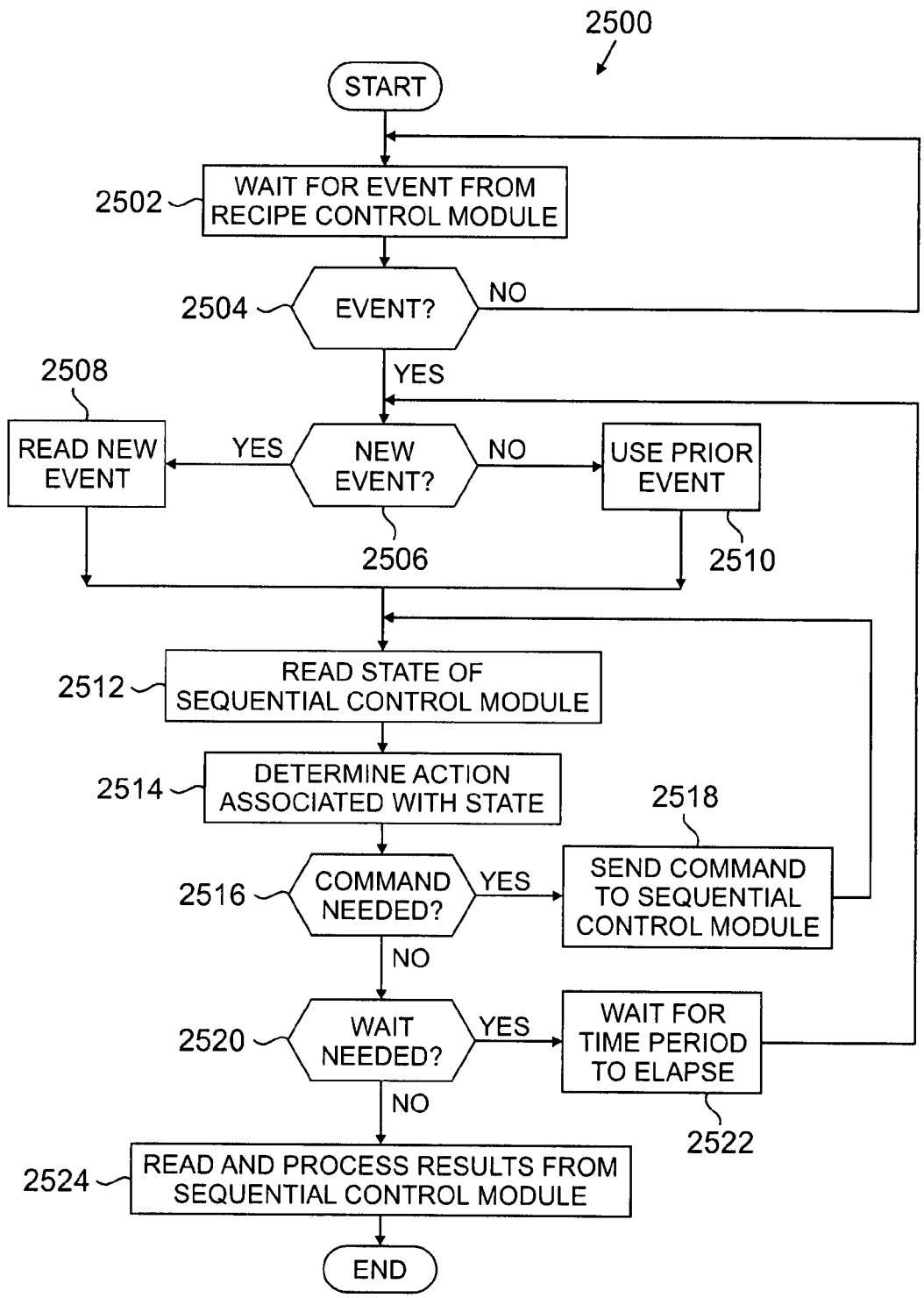
FIG. 25 illustrates an example method for supporting process automation using phase function blocks in a process control system in accordance with this disclosure.

FIG. 25 illustrates an example method 2500 for supporting process automation using phase function blocks in a process control system in accordance with this disclosure. For ease of explanation, the method 2500 is described as involving the phase function blocks 212 in the process control system 200 of FIG. 2. The method 2500 could be used with any other function blocks and systems.

After initiation, a phase function block 212 waits to receive an event from a recipe control module 204 at step 2502, and the phase function block 212 determines if an event is received at step 2504. If not, the phase function block 212 returns to step 2502. In this way, the phase function block 212 waits to receive a first event from the recipe control module 204. If no event is received, the phase function block 212 continues to wait for the event. The event could, for example, indicate that the phase function block 212 should begin execution.

When there is an event, if the event is new at step 2506, the phase function block 212 reads the new event at step 2508. Otherwise, the phase function block 212 uses a prior event at step 2510. The first event received by the phase function block 212 (allowing the phase function block 212 to break out of the loop in steps 2502-2504) is a new event, so the first event is read by the phase function block 212.

The phase function block 212 then reads the state of a sequential control module 206 at step 2512. The state could indicate that the sequential control module 206 is idle, running, and so on. The phase function block 212 206 determines an action associated with the sequential control module's state at step 2514. If a command is needed for the sequential control module 206 at step 2516, the phase function block 212 communicates a suitable command to the sequential control module 206 at step 2518. This could include, for example, the phase function block 212 issuing a Start command to the sequential control module 206 if the sequential control module 206 is in the Idle state. The phase function block 212 may then return to step 2512 to read another state from the sequential control module 206.

If a waiting period is needed for the sequential control module 206 at step 2520, the phase function block 212 waits for a time period to elapse at step 2522. This could include, for example, the phase function block 212 allowing a timer to elapse. In this case, the phase function block 212 may have issued a command earlier and is waiting for the sequential control module 206 to reach a particular state.

Otherwise, the phase function block 212 reads and processes report parameters from the sequential control module 206 at step 2524. In this case, it is assumed that the sequential control module 206 has reached a desired state and no more commands are required. The phase function block 212 may therefore read the results from the execution of the sequential control module 206 and use the results in any suitable manner.

Although FIG. 25 illustrates one example of a method 2500 for supporting process automation using phase function blocks in a process control system, various changes may be made to FIG. 25. For example, while shown as a series of steps, the steps shown in FIG. 25 could overlap or occur in parallel.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
at least one memory configured to store a recipe control module comprising a plurality of phase function blocks, the recipe control module associated with a process for producing at least one product or part thereof, each phase function block associated with a portion of the process; and
at least one processor configured to execute the phase function blocks, wherein each of the phase function blocks when executed is configured to:
acquire and initiate execution of a resource module providing control over an associated process element, the resource module comprising one of a plurality of resource modules providing control over a plurality of process elements;
provide one or more first parameters to the associated resource module, the one or more first parameters defining how the associated resource module implements the portion of the process using the associated process element;
retrieve one or more second parameters from the associated resource module, the one or more second parameters associated with results of the execution of the associated resource module;
project a state of the associated resource module to a corresponding state of the recipe control module and propagate a state of the recipe control module to a corresponding state of the associated resource module; and
release the associated resource module after execution of the associated resource module, wherein acquisition of one of the resource modules by one of the phase function blocks prevents acquisition of the resource module by the other phase function blocks until the resource module is released.

2. The apparatus of claim 1, wherein at least one additional phase function block when executed is configured to acquire and then not release one of the resource modules after execution of that resource module.

3. The apparatus of claim 1, wherein each resource module includes a sequential control module configured to provide access to one or more control modules, the one or more control modules configured to provide the control over the process element associated with that resource module.

4. The apparatus of claim 3, wherein each phase function block when executed is further configured to monitor a status of the sequential control module associated with the phase function block and to project data from the sequential control module to the recipe control module through the phase function block.

5. The apparatus of claim 3, wherein each phase function block when executed is further configured to:
reset the sequential control module acquired by that phase function block after execution of the sequential control module is complete;
wait at least a specified amount of time; and
release the sequential control module acquired by that phase function block.

6. The apparatus of claim 3, wherein the at least one processor is further configured to present a graphical user interface to a user, the graphical user interface configured to allow the user to create and modify the phase function blocks.

7. The apparatus of claim 6, wherein the graphical user interface is configured to allow the user, for each of the phase function blocks, to:
define the first and second parameters associated with that phase function block;
indicate whether that phase function block should acquire the sequential control module, execute the sequential control module, wait for a terminal state of the sequential control module before the phase function block completes, and release the sequential control module after the phase function block completes; and
define mappings between states of the recipe control module and states of the sequential control module.

8. The apparatus of claim 1, wherein the at least one processor is configured to execute multiple phase function blocks associated with the same process element simultaneously.

9. The apparatus of claim 1, wherein:
the plurality of phase function blocks are associated with a plurality of recipe control modules that are distributed in a plurality of controllers in a hard real-time process control system; and
the process element includes a piece of processing equipment used to produce at least one of a chemical, pharmaceutical, paper, or petrochemical product.

10. The apparatus of claim 9, wherein each phase function block is associated with an individual step in at least one of the recipe control modules.

11. The apparatus of claim 1, wherein the projected state of the resource module comprises an abnormal state of the resource module, and the propagated state of the recipe control module comprises an abnormal state of the recipe control module.

12. The apparatus of claim 1, wherein at least one of the phase function blocks is configured to complete execution without waiting for its resource module to reach a terminal state.

13. A method comprising:
storing a recipe control module comprising a plurality of phase function blocks, the recipe control module associated with a process for producing at least one product or part thereof, each phase function block associated with a portion of the process; and
executing the phase function blocks, wherein the executing includes, for each of the phase function blocks:
acquiring and initiating execution of a resource module providing control over an associated process element, the resource module comprising one of a plurality of resource modules providing control over a plurality of process elements;
providing one or more first parameters to the associated resource module, the one or more first parameters defining how the associated resource module implements the portion of the process using the associated process element;

retrieving one or more second parameters from the associated resource module, the one or more second parameters associated with results of the execution of the associated resource module;

projecting a state of the associated resource module to a corresponding state of the recipe control module and propagating a state of the recipe control module to a corresponding state of the associated resource module; and releasing the associated resource module after execution of the associated resource module, wherein acquisition of one of the resource modules by one of the phase function blocks prevents acquisition of the resource module by the other phase function blocks until the resource module is released.

14. The method of claim 13, further comprising:
executing at least one additional phase function block that acquires and then does not release one of the resource modules after execution of that resource module.

15. The method of claim 13, wherein:
each resource module includes a sequential control module configured to provide access to one or more control modules, the one or more control modules configured to provide the control over the process element associated with that resource module; and
the executing further includes, for each of the phase function blocks, monitoring a status of the sequential control module associated with that phase function block and projecting data from the sequential control module to the recipe control module through the phase function block.

16. The method of claim 15, wherein the projecting and propagating include:
mapping one or more first states from the recipe control module to one or more first states of the sequential control module; and
mapping one or more second states from the sequential control module to one or more second states of the recipe control module.

17. The method of claim 15, wherein the executing further includes, for each of the phase function blocks:
resetting the sequential control module acquired by that phase function block after execution of the sequential control module is complete;
waiting at least a specified amount of time; and
releasing the sequential control module acquired by that phase function block.

18. The method of claim 13, wherein the projected state of the resource module comprises an abnormal state of the resource module, and the propagated state of the recipe control module comprises an abnormal state of the recipe control module.

19. The method of claim 13, wherein a first of the phase function blocks is configured to complete execution without waiting for its associated resource module to reach a terminal state; and
further comprising initiating execution of a second of the phase function blocks after the first phase function block completes execution and prior to the resource module associated with the first phase function block reaching the terminal state.

20. A computer readable medium embodying a computer program, the computer program comprising computer readable program code for:

creating a recipe control module comprising a plurality of phase function blocks, the recipe control module associated with a process for producing at least one product or part thereof, each phase function block associated with a portion of the process; and executing the phase function blocks, wherein the executing includes, for each of the phase function blocks:
acquiring and initiating execution of a resource module providing control over an associated process element, the resource module comprising one of a plurality of resource modules providing control over a plurality of process elements;

providing one or more first parameters to the associated resource module, the one or more first parameters defining how the associated resource module implements the portion of the process using the process element;

retrieving one or more second parameters from the associated resource module, the one or more second parameters associated with results of the execution of the associated resource module;

projecting a state of the associated resource module to a corresponding state of the recipe control module and propagating a state of the recipe control module to a corresponding state of the associated resource module; and releasing the associated resource module after execution of the associated resource module, wherein acquisition of one of the resource modules by one of the phase function blocks prevents acquisition of the resource module by the other phase function blocks until the resource module is released.

21. The computer readable medium of claim 20, wherein:
each resource module includes a sequential control module configured to provide access to one or more control modules, the one or more control modules configured to provide the control over the process element associated with that resource module; and
the computer readable program code for executing the phase function blocks further includes, for each of the phase function blocks, computer readable program code for monitoring a status of the sequential control module associated with that phase function block and for projecting data from the sequential control module to the recipe control module through the phase function block.

22. The computer readable medium of claim 21, wherein the computer readable program code for projecting and the computer readable program code for propagating include:
computer readable program code for mapping one or more first states from the recipe control module to one or more first states of the sequential control module; and
computer readable program code for mapping one or more second states from the sequential control module to one or more second states of the recipe control module.

23. The computer readable medium of claim 21, wherein the computer readable program code for executing the phase function blocks further includes, for each of the phase function blocks, computer readable program code for:
resetting the sequential control module acquired by that phase function block after execution of the sequential control module is complete;
waiting at least a specified amount of time; and
releasing the sequential control module acquired by that phase function block.

* * * * *